US009380618B2

(12) United States Patent
Peng

(10) Patent No.: US 9,380,618 B2
(45) Date of Patent: Jun. 28, 2016

(54) BASE STATION, USER EQUIPMENT, AND COMMUNICATIONS METHOD

(71) Applicant: Huawei Technologies Co., Ltd., Shenzhen, Guangdong (CN)

(72) Inventor: Yan Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/563,852

(22) Filed: Dec. 8, 2014

(65) Prior Publication Data

US 2015/0094073 A1    Apr. 2, 2015

Related U.S. Application Data

(63) Continuation of application No. PCT/CN2012/076655, filed on Jun. 8, 2012.

(51) Int. Cl.
*H04W 36/00* (2009.01)
*H04W 76/02* (2009.01)
(Continued)

(52) U.S. Cl.
CPC ........ *H04W 76/021* (2013.01); *H04W 72/0406* (2013.01); *H04W 76/022* (2013.01); *H04W 36/00* (2013.01); *H04W 74/006* (2013.01); *H04W 76/025* (2013.01)

(58) Field of Classification Search
CPC ............ H04W 36/00; H04W 72/0406; H04W 74/006; H04W 76/021; H04W 76/022; H04W 76/025; H04W 76/02
USPC ........................ 455/436, 437, 450, 451, 452.2
See application file for complete search history.

(56) References Cited

U.S. PATENT DOCUMENTS

2011/0201311 A1\* 8/2011 Lee ..................... H04W 48/16
                                                                    455/411
2011/0244870 A1\* 10/2011 Lee ..................... H04W 52/244
                                                                    455/444

(Continued)

FOREIGN PATENT DOCUMENTS

CN          102469557 A       5/2012
JP          2013-534792 A     9/2013
WO       WO 2012/008739 A2    1/2012

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 v11.1.0, Mar. 2012, 194 pages.

(Continued)

*Primary Examiner* — Jean Gelin

(57) ABSTRACT

Embodiments of the present invention provide a base station, a user equipment, and a communications method. The base station includes: a correspondence maintaining module, configured to maintain a correspondence between a service bearer of a UE accessing the base station and a first target data base station; and a service bearer processing module, configured to control the first target data base station and the UE to complete processing of a service bearer procedure of the UE, where the first target data base station is a base station that exchanges user plane data with the UE after completing the processing of the service bearer procedure of the UE. The technical solutions of the present invention implement separation of an air interface signaling plane and a user plane and solve an access problem of the UE.

18 Claims, 21 Drawing Sheets

(51) Int. Cl.
*H04W 72/04* (2009.01)
*H04W 74/00* (2009.01)

(56) References Cited

U.S. PATENT DOCUMENTS

| | | | |
|---|---|---|---|
| 2011/0294508 A1* | 12/2011 | Min | H04W 36/0083 455/436 |
| 2011/0300807 A1 | 12/2011 | Kwun et al. | |
| 2013/0165130 A1* | 6/2013 | Wu | H04W 36/08 455/444 |
| 2013/0288729 A1* | 10/2013 | Islam | H04W 76/022 455/509 |
| 2013/0310059 A1* | 11/2013 | Parkvall | H04W 72/0446 455/452.1 |
| 2014/0004863 A1 | 1/2014 | Zhang et al. | |
| 2014/0010125 A1* | 1/2014 | Tillman | H04B 7/2643 370/280 |
| 2014/0018082 A1* | 1/2014 | Cheng | H04W 36/0005 455/444 |
| 2014/0126530 A1* | 5/2014 | Siomina | H04W 52/146 370/330 |
| 2014/0321371 A1* | 10/2014 | Anderson | H04W 76/028 370/329 |
| 2014/0342738 A1* | 11/2014 | Ishii | H04W 28/08 455/436 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 v10.5.0, Mar. 2012, 302 pages.

"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 v11.0.0, Mar. 2012, 134 pages.

"Requirements, Candidate Solutions & Technology Roadmap for LTE Rel-12 Onward", NTT Docomo, Inc., 3GPP Workshop on Release 12 and onwards, Jun. 11-12, 2012, 2 pages, RWS-120010.

* cited by examiner though the UE needs to be connected to a macro eNB that is relatively far away, which requires an increase in transmit power and air interface resource consumption. If the UE is attached to a near pico eNB, air interface resource consumption can be reduced but the number of handovers and a handover failure ratio may be increased, thereby causing a service interruption of the UE.

BASE STATION, USER EQUIPMENT, AND COMMUNICATIONS METHOD

CROSS-REFERENCE TO RELATED APPLICATION

This application is a continuation of International Application No. PCT/CN2012/076655, filed on Jun. 8, 2012 which is hereby incorporated by reference in their entireties.

TECHNICAL FIELD

The present invention relates to communications technologies, and in particular, to a base station, a user equipment, and a communications method.

BACKGROUND

In a process of network development towards broadbandization and mobilization, the 3rd Generation Partnership Project (3rd Generation Partnership Program, 3GPP) organization puts forward a Long Term Evolution (Long Term Evolution, LTE) scheme, that is, an evolved universal terrestrial radio access network (E-UTRAN), for a mobile access network; and a system architecture evolution (SAE) scheme, that is, an evolved packet core (Evolved Packet Core, EPC), for a mobile core network.

An E-UTRAN adopts a single-layer structure consisting of only an evolved NodeB (eNB) to simplify a network and reduce a delay. An interface between a user equipment (UE) and an eNB is a Uu interface, which is a radio interface. A user plane of a Uu interface is mainly used to transfer an Internet Protocol (IP) data packet, and mainly completes functions such as header compression, encryption, scheduling, a hybrid automatic repeat request (HARQ), and an automatic repeat-request (ARQ). A signaling plane of a Uu interface is mainly used to transmit a signaling message. Control plane signaling of a UE, for example, radio resource control (RRC) signaling, is mapped to a signaling radio bearer (SRB) for transmission; and all IP data packets of a user plane are mapped to different data radio bearers (DRB) for transmission. An SRB and a DRB are first processed by a packet data convergence protocol (PDCP) sublayer and a radio link control (Radio Link Control, RLC) sublayer respectively, and then are multiplexed at a media access control (Media Access Control, MAC) sublayer. A DRB and an SRB of a UE share a same MAC entity, that is, a user plane and a control plane of a same UE are anchored on a same eNB.

In a case that overlapped coverage exists between a macro cell and a micro cell, for a UE with high mobility, if the UE is attached to a macro eNB with a large coverage scope, factors affecting user experience, such as a service interruption and throughput reduction that may be caused by frequent handovers, can be avoided. However, the UE needs to be connected to a macro eNB that is relatively far away, which requires an increase in transmit power and air interface resource consumption. If the UE is attached to a near pico eNB, air interface resource consumption can be reduced but the number of handovers and a handover failure ratio may be increased, thereby causing a service interruption of the UE.

For the foregoing problem, an idea of separating an air interface control plane from a user plane is put forward in the prior art, where a signaling base station (signalling BS) provides a signaling connection for a UE and a data base station (Data BS) provides a data connection for the UE. However, an access problem of the UE is not solved.

SUMMARY

The present invention provides a base station, a user equipment, and a communications method, so as to implement separation of an air interface signaling plane and a user plane, and solve an access problem of a UE.

One aspect of the present invention provides a base station, including:

a correspondence maintaining module, configured to maintain a correspondence between a service bearer of a user equipment UE accessing the base station and a first target data base station; and a service bearer processing module, configured to control the first target data base station and the UE to complete processing of a service bearer procedure of the UE; where:

the first target data base station is a base station that exchanges user plane data with the UE after completing the processing of the service bearer procedure of the UE.

One aspect of the present invention further provides a communications method, including:

maintaining, by a base station, a correspondence between a service bearer of a user equipment UE accessing the base station and a first target data base station; and controlling, by the base station, the first target data base station and the UE to complete processing of a service bearer procedure of the UE; where:

the first target data base station is a base station that exchanges user plane data with the UE after completing the processing of the service bearer procedure of the UE.

Another aspect of the present invention provides a base station, including:

a receiving module, configured to receive a service bearer request message sent by a basic-layer base station corresponding to the base station, where the basic-layer base station is configured to control the base station and a user equipment UE to complete processing of a service bearer procedure of the UE;

a processing module, configured to perform processing on the service bearer procedure of the UE according to the service bearer request message; and a sending module, configured to return a service bearer response message to the basic-layer base station after the processing of the service bearer procedure is complete.

Another aspect of the present invention further provides a communications method, including:

receiving, by a base station, a service bearer request message sent by a basic-layer base station corresponding to the base station, where the basic-layer base station is configured to control the base station and a user equipment UE to complete processing of a service bearer procedure of the UE;

performing, by the base station, processing on the service bearer procedure of the UE according to the service bearer request message; and returning, by the base station, a service bearer response message to the basic-layer base station after completing the processing of the service bearer procedure.

Still another aspect of the present invention provides a user equipment, including:

a reconfiguration message receiving module, configured to receive a radio resource control RRC connection reconfiguration message sent by a base station, and maintain an association relationship between an identifier of a data radio bearer DRB of a service bearer of the UE and an identifier of a carrier or a carrier group according to the RRC connection reconfiguration message, where the RRC connection reconfiguration message includes: adding, deleting, or modifying the association relationship between an identifier of a DRB of a service bearer of the UE and an identifier of a carrier or a carrier group;

a reconfiguration completion message sending module, configured to perform processing of a service bearer procedure according to the RRC connection reconfiguration message and send, after completing the processing of the service bearer procedure, an RRC connection reconfiguration completion message to the base station; and a data transmitting module, configured to perform data transmission of the DRB on an associated carrier or carrier group according to the maintained association relationship between an identifier of a DRB of a service bearer of the UE and an identifier of a carrier or a carrier group.

Still another aspect of the present invention further provides a communications method, including:

receiving, by a user equipment UE, a radio resource control RRC connection reconfiguration message sent by a base station, and maintaining an association relationship between an identifier of a data radio bearer DRB of a service bearer of the UE and an identifier of a carrier or a carrier group according to the RRC connection reconfiguration message, where the RRC connection reconfiguration message includes: adding, deleting, or modifying the association relationship between an identifier of a DRB of a service bearer of the UE and an identifier of a carrier or a carrier group; and performing, by the UE, data transmission of the DRB on an associated carrier or carrier group according to the maintained association relationship between an identifier of a DRB of a service bearer of the UE and an identifier of a carrier or a carrier group.

According to the base station and the communications method that are provided by one aspect of the present invention, a corresponding candidate data base station list is maintained for a UE, a first target data base station is selected from the candidate data base station list for a service bearer of the UE, and the first target data base station and the UE are controlled to complete processing of a service bearer procedure of the UE, which implements control over a signaling connection of a UE, provides UE connectivity, and may solve an access problem of the UE in a case that an air interface signaling plane of a UE is separated from a user plane.

According to the base station and the communications method that are provided by another aspect of the present invention, a service bearer request message sent by a signaling base station is received, processing is performed on a service bearer procedure of a UE according to the service bearer request message, and a service bearer response message is returned to the signaling base station after the processing of the service bearer procedure is complete, which completes user plane data transmission with a UE over control of a signaling base station and may solve an access problem of the UE in a case that an air interface signaling plane of a UE is separated from a user plane.

According to the user equipment and the communications method that are provided by still another aspect of the present invention, a UE receives an RRC connection reconfiguration message sent by a signaling base station and performs, according to an identifier that is carried in the RRC connection reconfiguration message and is of a carrier or a carrier group on a target data base station and associated with a service bearer of the UE, user plane data transmission with the target data base station on the associated carrier or carrier group, thereby providing a condition for separating an air interface signaling plane of a UE from a user plane and solves a transmission problem of user plane data.

BRIEF DESCRIPTION OF THE DRAWINGS

To describe the technical solutions in the embodiments of the present invention clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In the embodiments of the present invention, a communications network may be divided into two layers: one is a basic layer, which is used to provide seamless basic coverage, and one is an enhanced layer, which is used to provide high-traffic transmission in a hotspot area. The basic layer is mainly covered by a basic-layer base station and the enhanced layer is covered by an enhanced-layer base station (which may be known as a data base station). The basic-layer base station is mainly responsible for basic coverage including signaling interaction of an air interface control plane, while the enhanced-layer base station is mainly responsible for data exchange of an air interface user plane.

The basic-layer base station is generally a high-power node and may be known as a CeNB. A basic layer of a communications network is generally covered by multiple CeNBs. A coverage hole may be caused once a CeNB is missing. In addition, the base station in the embodiment may also be a low-power node in the case of blank area coverage (blank area coverage).

The basic-layer base station generally uses a low frequency band for transferring control plane signaling, for example, an RRC connection of a UE is established on a basic-layer base station. Optionally, a basic-layer base station may further bear partial service bearers with a small amount of data of a UE.

The enhanced-layer base station is generally a low-power node and may be known as a TeNB. An enhanced layer of a communications network is generally covered by multiple TeNBs. An enhanced-layer base station generally uses a high frequency band for transferring a great many service data, for example, a service bearer for carrying a large amount of data of a UE, and for example, a File Transfer Protocol (File Transfer Protocol, FTP) and a video. There is no S1-MME interface between an enhanced-layer base station and a mobility management entity (Mobility Management Entity, MME). An SX interface is used for information exchange between an enhanced-layer base station and a basic-layer base station. The S1-MME interface refers to a control plane of an S1 interface.

Figure 1A:
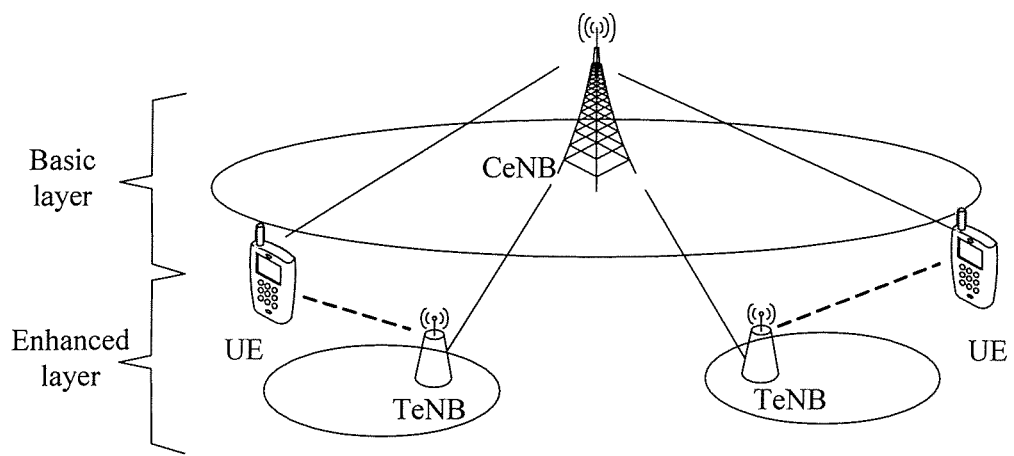
FIG. 1A is a schematic structural diagram of a communications network according to an embodiment of the present invention.

For a UE, there is a basic-layer base station, and there may be one or more enhanced-layer base stations or there may be no enhanced-layer base station. A structural diagram of the foregoing communications network with a two-layer structure is shown in FIG. 1A. In FIG. 1A, a solid line between a UE and a TeNB indicates a signaling connection of a control plane, and a dashed line between a UE and a TeNB indicates a data connection of a user plane.

The following describes in detail specific implementation structures and working principles of a basic-layer base station and an enhanced-layer base station by using specific embodiments.

Figure 1B:
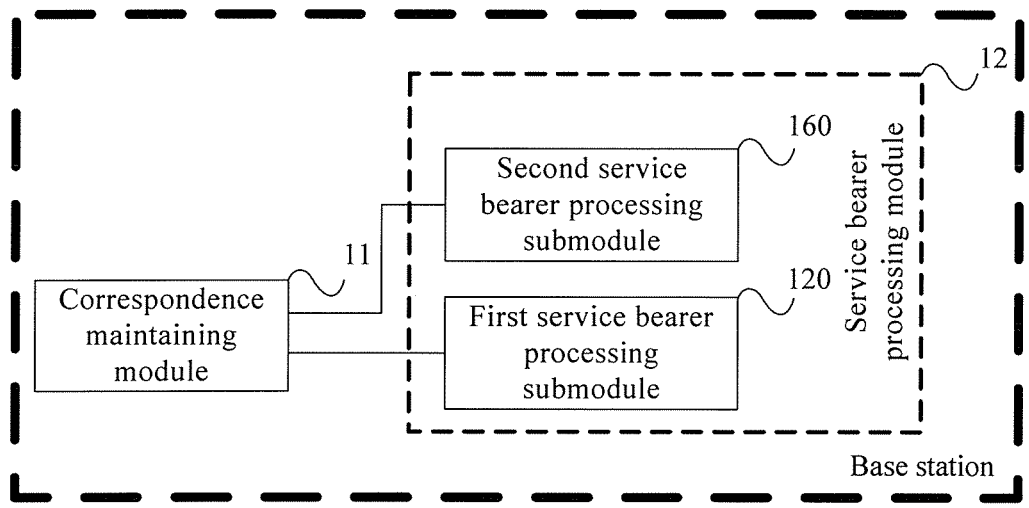
FIG. 1B is a schematic structural diagram of a base station according to an embodiment of the present invention.

FIG. 1B is a schematic structural diagram of a base station according to an embodiment of the present invention. As shown in FIG. 1B, the base station of the embodiment includes: a correspondence maintaining module 11 and a service bearer processing module 12.

The correspondence maintaining module 11 is configured to maintain a correspondence between a service bearer of a UE accessing the base station and a first target data base station.

The service bearer processing module 12 is connected to the correspondence maintaining module 11 and configured to control the first target data base station and the UE accessing the base station that are maintained by the correspondence maintaining module 11 to complete processing of a service bearer procedure.

The base station provided by the embodiment is a basic-layer base station and the first target data base station in the embodiment is an enhanced-layer base station. The first target data base station is a base station that exchanges user plane data with the UE (that is, responsible for data transmission of the service bearer of the UE) after completing the processing of the service bearer procedure of the UE.

The base station of the embodiment maintains the correspondence between the service bearer of the UE accessing the base station and the first target data base station by using the correspondence maintaining module 11, to provide a condition for the first target data base station to take charge of data transmission of the service bearer of the UE.

Optionally, the base station of the embodiment may have a capability of a downlink broadcast channel and provide, by broadcasting a downlink channel, a condition for selecting the base station of the embodiment as a point of attachment for the UE.

Optionally, a data base station (for example, the first target data base station) does not have a capability of a downlink broadcast channel, thereby ensuring that the UE attaches to only the base station of the embodiment, that is, the basic-layer base station, at the beginning.

That the base station of the embodiment uses the service bearer processing module 12 to control the first target data base station and the UE to complete processing of the service bearer procedure mainly includes: controlling the first target data base station to perform corresponding processing for transmitting data in the service bearer of the UE; controlling the UE to perform corresponding configuration for transmitting, by using the first target data base station, service bearers; and the like.

Based on this, an optional implementation structure of the service bearer processing module 12 of the embodiment includes: a first service bearer processing submodule 120 and a second service bearer processing submodule 160.

The first service bearer processing submodule 120 is connected to the correspondence maintaining module 11 and configured to: acquire an identifier of the first target data base station from the correspondence maintaining module 11; send a service bearer request message to the first target data base station according to the identifier of the first target data base station, so as to control the first target data base station to perform the processing of the service bearer procedure of the UE; and receive a service bearer response message that the first target data base station returns after completing the processing of the service bearer procedure.

The second service bearer processing submodule 160 is configured to send an RRC connection reconfiguration message to the UE, so as to control the UE to perform corresponding configuration for the service bearer procedure to complete the processing of the service bearer procedure. Optionally, the second service bearer processing submodule 160 is connected to the first service bearer processing submodule 120 and configured to send an RRC connection reconfiguration message to the UE after the first service bearer processing submodule 120 completes interaction with the first target data base station, but no limitation is posed thereon. Optionally, the correspondence maintaining module 11 is connected to the second service bearer processing submodule 160 and configured to update the maintained correspondence after the second service bearer processing submodule 160 controls the UE to complete the processing of the service bearer procedure.

Optionally, an interface for information exchange between the base station of the embodiment and each data base station may be known as an SX interface.

The base station of the embodiment, by cooperating with a data base station, maintaining a correspondence between a UE and a target data base station that is responsible for data transmission in a service bearer of the UE, and controlling the target data base station and the UE to complete processing of a service bearer procedure, implements user plane data exchange between the data base station and the UE. In addition, the base station of the embodiment is responsible for signaling transmission of a signaling plane, thereby implementing separation of a signaling plane and a user plane and solving an access problem of the UE in a case that overlapped coverage exists between a macro cell and a micro cell.

The foregoing service bearer procedure may include a service bearer setup procedure, a service bearer modification procedure, a service bearer deletion procedure, a service bearer switch-in procedure, a service bearer switch-out procedure, or the like. For different service bearer procedures, specific implementation of the maintaining, by the base station of the embodiment, a correspondence between a UE and a first target data base station and controlling the first target data base station and the UE to complete processing of a service bearer procedure is different. The following provides detailed description for a specific service bearer procedure.

Figure 2:
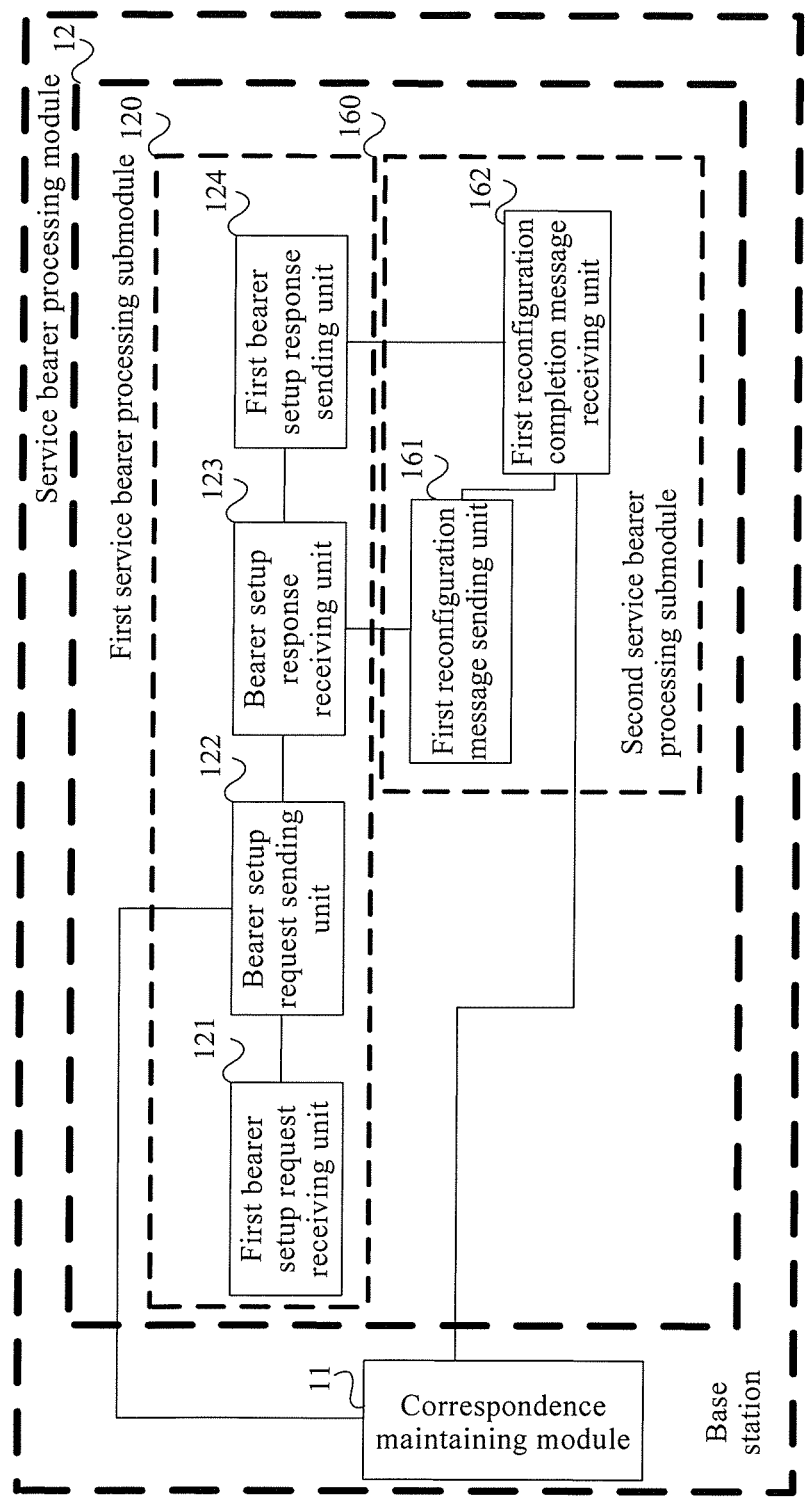
FIG. 2 is a schematic structural diagram of a base station according to another embodiment of the present invention.

For example, the service bearer procedure of the UE may be a service bearer setup procedure; and in this case, the service bearer request message is a service bearer setup request message and the service bearer response message is a service bearer setup response message. Based on this, the first service bearer processing submodule 120 may include: a first bearer setup request receiving unit 121, a bearer setup request sending unit 122, a bearer setup response receiving unit 123, and a first bearer setup response sending unit 124. Accordingly, the second service bearer processing submodule 160 may include: a first reconfiguration message sending unit 161 and a first reconfiguration completion message receiving unit 162. FIG. 2 shows a structure corresponding to the base station of the embodiment.

The first bearer setup request receiving unit 121 is configured to receive the service bearer setup request message sent by a core network device, where the service bearer setup request message includes an identifier of the UE, an identifier of a first service bearer, and quality of service (Quality of Service, QoS) information of the first service bearer. The first service bearer is a service bearer to be set up. It is noted herein that the core network device of the embodiment of the present invention may be an MME node in an LTE system, but no limitation is posed thereon.

Optionally, the identifier of the UE in the service bearer setup request message may be an eNB UE S1AP ID field. Because the bearer setup request message herein is sent to a basic-layer base station by the core network device (for example, an MME), the eNB UE S1AP ID field indicates an identifier of the UE at a base station side of the embodiment. The identifier of the first service bearer may be an E-RAB ID. The E-RAB ID may be a list, indicating that multiple service bearers need to be set up at the same time.

The bearer setup request sending unit 122 is connected to the first bearer setup request receiving unit 121 and the correspondence maintaining module 11, and is configured to acquire the identifier of the first target data base station from the correspondence maintaining module 11, and send the service bearer setup request message including first information to the first target data base station according to the identifier of the first target data base station, so that the first target data base station establishes a context of the UE and information of the first service bearer, and configures a DRB on the first target data base station for the first service bearer. The bearer setup request sending unit 122 may send the service bearer setup request message to the first target data base station by using an SX interface between the bearer setup request sending unit 122 and the first target data base station.

The first information may be added to the service bearer setup request message by the bearer setup request sending unit 122. The first information includes one piece of the following information: a DRB adding instruction; a DRB adding instruction and adding an association relationship between an identifier of the added DRB and an identifier of a carrier or a carrier group on the first target data base station; a DRB adding instruction and an access network identifier of the UE; and a DRB adding instruction, adding an association relationship between an identifier of the added DRB and an identifier of a carrier or a carrier group on the first target data base station, and an access network identifier of the UE.

The foregoing information added to the service bearer setup request message shows that the DRB adding instruction is mandatory information, while the adding an association relationship between an identifier of the added DRB and an identifier of a carrier or a carrier group on the first target data base station and the access network identifier of the UE are optional information. For example, if the carrier or the carrier group on the first target data base station has only one carrier, the service bearer setup request message may not include the adding an association relationship between an identifier of the added DRB and an identifier of a carrier or a carrier group on the first target data base station. For example, if the UE has a DRB that has been associated with a carrier or a carrier group on the first target data base station, the service bearer setup request message may not include the access network identifier of the UE.

The context, which is established by the first target data base station, of the UE mainly includes: the access network identifier (C-RNTI) for configuration of the UE and the like. The information, established by the first target data base station, of the first service bearer mainly includes: identifier (E-RAB ID) for configuration of the first service bearer, a QoS parameter (E-RAB Level QoS Parameters) of the first service bearer, a transport layer address (Transport Layer Address, TNL), tunnel port information (GTP-TEID), and the like. That the first target data base station configures a DRB on the first target data base station for the first service bearer includes: configuring a logical channel identity of a DRB, associating the configured DRB with a carrier or a carrier group that is on the first target data base station and identified by the identifier in the service bearer setup request message, and the like.

Optionally, the bearer setup request sending unit 122 may further directly forward the service bearer setup request message to the first target data base station.

Optionally, in addition to adding new information to the service bearer setup request message, the bearer setup request sending unit 122 may further modify several fields in the service bearer setup request message. For example, the bearer setup request sending unit 122 may modify an identifier field of the message on a sending party in the service bearer setup request message, for example, in an identifier (MME UE S1AP ID) field of the message at an MME side, modify content of the identifier field from an identifier of the UE at the MME side to an identifier of the UE at a base station side of the embodiment. In addition, the bearer setup request sending unit 122 may further modify an identifier field of the message on a receiving party, for example, in an identifier (eNB UE S1AP ID) field of the message at a base station side, modify content of the identifier field from the identifier of the UE at the base station side of the embodiment to an identifier of the UE at a first target data base station side. Moreover, the bearer setup request sending unit 122 may further modify a transport layer address (Transport Layer Address) field, a GTP tunnel endpoint identifier (GTP-TEID) field, and the like. A transport layer address and a GTP tunnel endpoint identifier are collectively known as a "tunnel identifier".

The bearer setup response receiving unit 123 is connected to the bearer setup request sending unit 122 and configured to: after the bearer setup request sending unit 122 sends the service bearer setup request message to the first target data base station, receive the service bearer setup response message, which is sent by the first target data base station after processing of a setup preparation procedure of the first service bearer is complete. The service bearer setup response message may include one piece of the following information: information indicating whether the first service bearer is successfully set up; and information indicating whether the first service bearer is successfully set up, and a random access resource for the UE to access the first target data base station. In addition, the service bearer setup response message may further include an address of a tunnel for transmitting downlink data of the first service bearer, but no limitation is posed thereon. The bearer setup response receiving unit 123 may receive the service bearer setup response message by using the SX interface between the bearer setup response receiving unit 123 and the first target data base station.

The first bearer setup response sending unit 124 is configured to: after the bearer setup response receiving unit 123 receives the service bearer setup response message, send a response message indicating whether the service bearer is successfully set up to the core network device. In this way, the core network device can know a service bearer setup result in time, so as to perform corresponding processing. It is noted herein that whether the service bearer is successfully set up includes whether the first target data base station successfully performs relevant processing of a setup procedure of the first service bearer and whether the UE successfully performs the relevant processing of the setup procedure of the first service bearer. When both the first target data base station and the UE successfully perform the relevant processing of the setup procedure of the first service bearer, it is regarded that the service bearer is successfully set up. Optionally, the first bearer setup response sending unit 124 is connected to the bearer setup response receiving unit 123 and the first reconfiguration completion message receiving unit 162. The first bearer setup response sending unit 124 may specifically send, after the bearer setup response receiving unit 123 and the first reconfiguration completion message receiving unit 162 receive the service bearer setup response message and a first RRC connection reconfiguration completion message respectively, a response message indicating whether the service bearer is successfully set up to the core network device.

In this example, the correspondence maintaining module 11 is further configured to select the first target data base station from a candidate data base station list of the UE for the first service bearer. Specifically, the correspondence maintaining module 11 is further connected to the first bearer setup request receiving unit 121 and configured to: after the first bearer setup request receiving unit 121 receives the service bearer setup request message, select the first target data base station from the candidate data base station list of the UE for the first service bearer and provide the first target data base station for the bearer setup request sending unit 122. The candidate data base station list of the UE includes the identifier of the UE and an identifier of a data base station corresponding to the UE.

The first reconfiguration message sending unit 161 is connected to the bearer setup response receiving unit 123 and configured to: after the bearer setup response receiving unit 123 receives the service bearer setup response message, send a first RRC connection reconfiguration message to the UE, so as to control the UE to perform DRB configuration for setting up the first service bearer on the first target data base station. In the setup procedure of the first service bearer, the first RRC connection reconfiguration message includes a DRB adding instruction and adding an association relationship between an identifier of the added DRB and an identifier of a carrier or a carrier group on the first target data base station. The adding an association relationship between an identifier of the added DRB and an identifier of a carrier or a carrier group on the first target data base station that the base station of the embodiment makes the first RRC connection reconfiguration message carry may be regarded as an instruction of adding the first target data base station as a secondary node to the setup procedure of the first service bearer.

The instruction of adding the first target data base station as a secondary node to the setup procedure of the first service is classified into two cases: one case is that the first target data base station has been providing a service for the UE; and in this case, when the first reconfiguration message sending unit 161 sets up a new first service bearer for the UE by using the first RRC connection reconfiguration message, the UE is mainly controlled to associate the first service bearer with one component carrier or component carrier group on the first target data base station, so as to subsequently perform data transmission for a DRB of the first service bearer by using the associated carrier or carrier group. Another case is that the first target data base station is not providing a service for the UE; and in this case, the first reconfiguration message sending unit 161 configures the carrier or the carrier group on the first target data base station as a secondary component carrier of the UE by using the first RRC connection reconfiguration message, and associates, when setting up a new first service bearer for the UE, the first service bearer with one component carrier or one component carrier group on the first target data base station, so as to subsequently perform data transmission for a DRB of the first service bearer by using the associated carrier or carrier group. It is noted herein that, in this case, the adding, by the base station of the embodiment, a component carrier or a component carrier group for the UE, and the instructing the UE to set up a new first service bearer and associate the first service bearer with one component carrier or one component carrier group on the first target data base station are completed in one message.

The first reconfiguration completion message receiving unit 162 is connected to the first reconfiguration message sending unit 161 and configured to receive the first RRC connection reconfiguration completion message, which is sent by the UE after the processing of the setup procedure of the first service bearer is complete. Specifically, the first reconfiguration completion message receiving unit 162 is configured to: after the first reconfiguration message sending unit 161 sends the first RRC connection reconfiguration message, receive the first RRC connection reconfiguration completion message sent by the UE.

Further, the correspondence maintaining module 11 is specifically configured to record a correspondence between the first service bearer and the first target data base station, that is, record a correspondence between a bearer of the UE and a data base station that is responsible for transmitting data in the bearer. The correspondence maintaining module 11 is further connected to the first reconfiguration completion message receiving unit 162 and configured to: after the first reconfiguration completion message receiving unit 162 receives the first RRC connection reconfiguration completion message, record the correspondence between the first service bearer and the first target data base station.

It is noted herein that, before the setup procedure of the first service bearer is performed, the UE accesses the base station of the embodiment and establishes an RRC connection on the base station of the embodiment.

It is further noted that the UE returns the first RRC connection reconfiguration completion message to the base station of the embodiment after completing, according to the first RRC connection reconfiguration message, configuration for setting up the first service bearer. Optionally, in this procedure, the UE initiates a random access procedure to the first target data base station, so as to access the first target data base station. Later, the base station of the embodiment sends the response message indicating whether the service bearer is successfully set up to the core network device, so as to notify the core network device whether the first service bearer is successfully set up. After that, uplink data and downlink data of the first service bearer of the UE are both transmitted by using the first target data base station.

Figure 3:
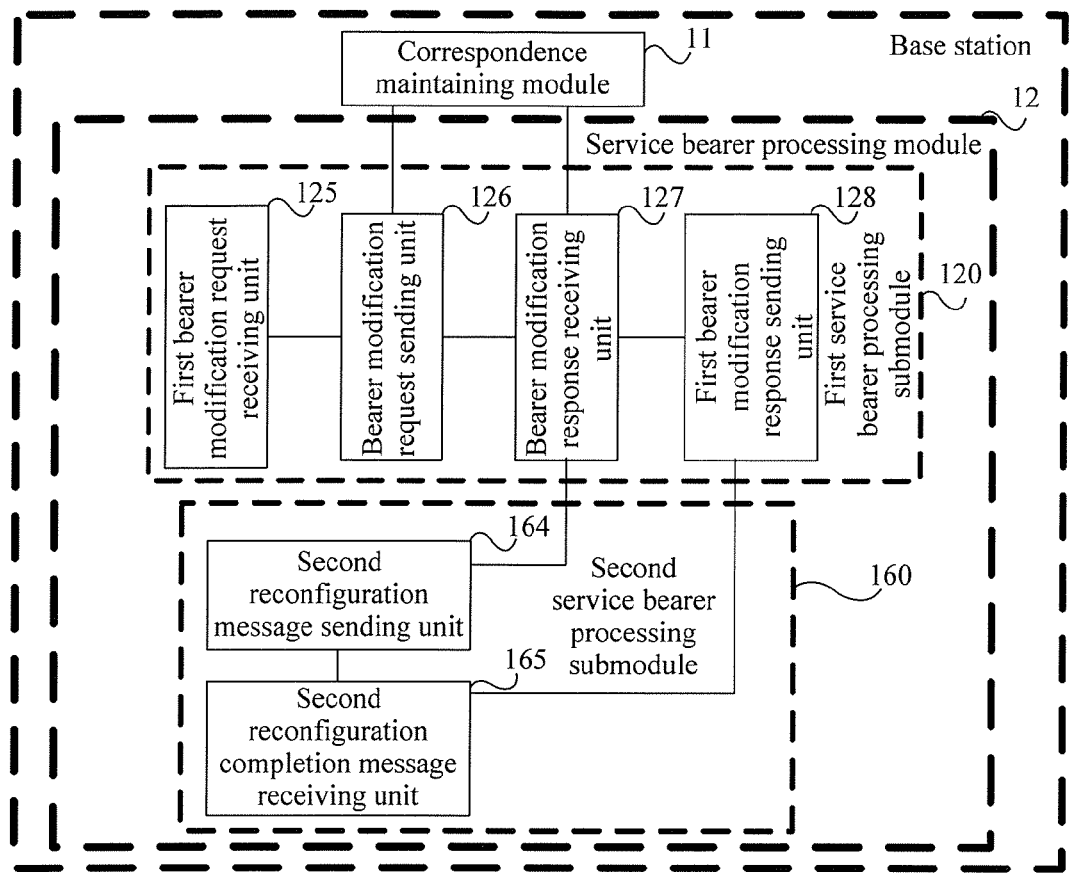
FIG. 3 is a schematic structural diagram of a base station according to still another embodiment of the present invention.

For another example, the service bearer procedure of the UE is a service bearer modification procedure, the service bearer request message is a service bearer modification request message, and the service bearer response message is a service bearer modification response message. In this case, the first service bearer processing submodule 120 of the embodiment may include: a first bearer modification request receiving unit 125, a bearer modification request sending unit 126, a bearer modification response receiving unit 127, and a first bearer modification response sending unit 128. Accordingly, the second service bearer processing submodule 160 may include: a second reconfiguration message sending unit 164 and a second reconfiguration completion message receiving unit 165. FIG. 3 shows a structure corresponding to the base station of the embodiment.

The first bearer modification request receiving unit 125 is configured to receive the service bearer modification request message sent by a core network device, where the service bearer modification request message includes an identifier of the UE, an identifier of a second service bearer, and QoS information of the second service bearer. The second service bearer is a service bearer to be modified. Optionally, the identifier of the UE may be an eNB UE S1AP ID field.

Optionally, the identifier of the second service bearer may be an E-RAB ID field in the service bearer modification request message.

The bearer modification request sending unit 126 is connected to the first bearer modification request receiving unit 125 and the correspondence maintaining module 11, and is configured to acquire the identifier of the first target data base station from the correspondence maintaining module 11, and send the service bearer modification request message including a DRB modification instruction to the first target data base station according to the identifier of the first target data base station, so that the first target data base station modifies information of the second service bearer and a DRB configuration of the second service bearer on the first target data base station. The foregoing DRB modification instruction may be added to the service bearer modification request message by the first bearer modification request receiving unit 125.

Specifically, the bearer modification request sending unit 126 may acquire, according to the identifier of the second service bearer in the service bearer modification request message received by the first bearer modification request receiving unit 125, the identifier of the first target data base station from a correspondence that is between the second service bearer and the first target data base station and recorded by the correspondence maintaining module 11.

Before sending the service bearer modification request message received by the first bearer modification request receiving unit 125 to the first target data base station, the bearer modification request sending unit 126 may modify information in the service bearer modification request message, for example, add new information, and then send a modified service bearer modification request message to the first target data base station. The service bearer modification request message that the bearer modification request sending unit 126 sends to the first target data base station further includes the DRB modification instruction. The first target data base station specifically modifies the DRB configuration of the second service bearer on the first target data base station according to the DRB modification instruction.

It is noted herein that the modification of the second service bearer mainly includes two cases: one is to update a target data base station corresponding to the second service bearer, and the other is to modify a QoS parameter corresponding to the second service bearer. In a manner of the embodiment, the modification of the second service bearer is to modify the QoS parameter corresponding to the second service bearer. The base station of the embodiment specifically implements the modification of the QoS parameter of the second service bearer by sending the RRC connection reconfiguration message to the UE. Information included in the RRC connection reconfiguration message that the base station of the embodiment sends to the UE is the same as information in an RRC connection reconfiguration message that a base station in the prior art sends to a UE when modifying a QoS parameter of a service bearer, and details are not described herein again.

The bearer modification response receiving unit 127 is configured to receive the service bearer modification response message, which is sent by the first target data base station after processing of a modification procedure of the second service bearer is complete. Accordingly, the service bearer modification response message that the first target data base station sends to the base station of the embodiment is the same as a service bearer modification response message that a UE in the prior art sends to a base station, and details are not described herein again.

Optionally, the bearer modification response receiving unit 127 is connected to the bearer modification request sending unit 126 and specifically configured to receive the service bearer modification response message after the bearer modification request sending unit 126 sends the service bearer modification request message.

The first bearer modification response sending unit 128 is configured to: after the bearer modification response receiving unit 127 receives the service bearer modification response message, send a response message indicating whether the service bearer is successfully modified to the core network device. Optionally, the first bearer modification response sending unit 128 is connected to the bearer modification response receiving unit 127 and the second reconfiguration completion message receiving unit 165. The first bearer modification response sending unit 128 is configured to: after the bearer modification response receiving unit 127 and the second reconfiguration completion message receiving unit 165 receive the service bearer modification response message and a second RRC connection reconfiguration completion message respectively, send a response message indicating whether the service bearer is successfully modified to the core network device.

The second reconfiguration message sending unit 164 is connected to the bearer modification response receiving unit 127 and configured to: after the bearer modification response receiving unit 127 receives the service bearer modification response message, send a second RRC connection reconfiguration message to the UE, so that the UE modifies a DRB configuration of the second service bearer. The second RRC connection reconfiguration message includes the DRB modification instruction.

The second reconfiguration completion message receiving unit 165 is connected to the second reconfiguration message sending unit 164 and configured to receive the second RRC connection reconfiguration completion message, which is sent by the UE after the processing of the modification procedure of the second service bearer is complete.

It is noted herein that, before the modification procedure of the second service bearer is performed, the UE accesses the base station of the embodiment and establishes an RRC connection on the base station of the embodiment, and further sets up the second service bearer on the first target data base station over control of the base station of the embodiment.

After the modification procedure of the second service bearer is performed, uplink data and downlink data over the second service bearer are continuously transmitted between the UE and the first target data base station based on a modified QoS parameter.

Figure 4:
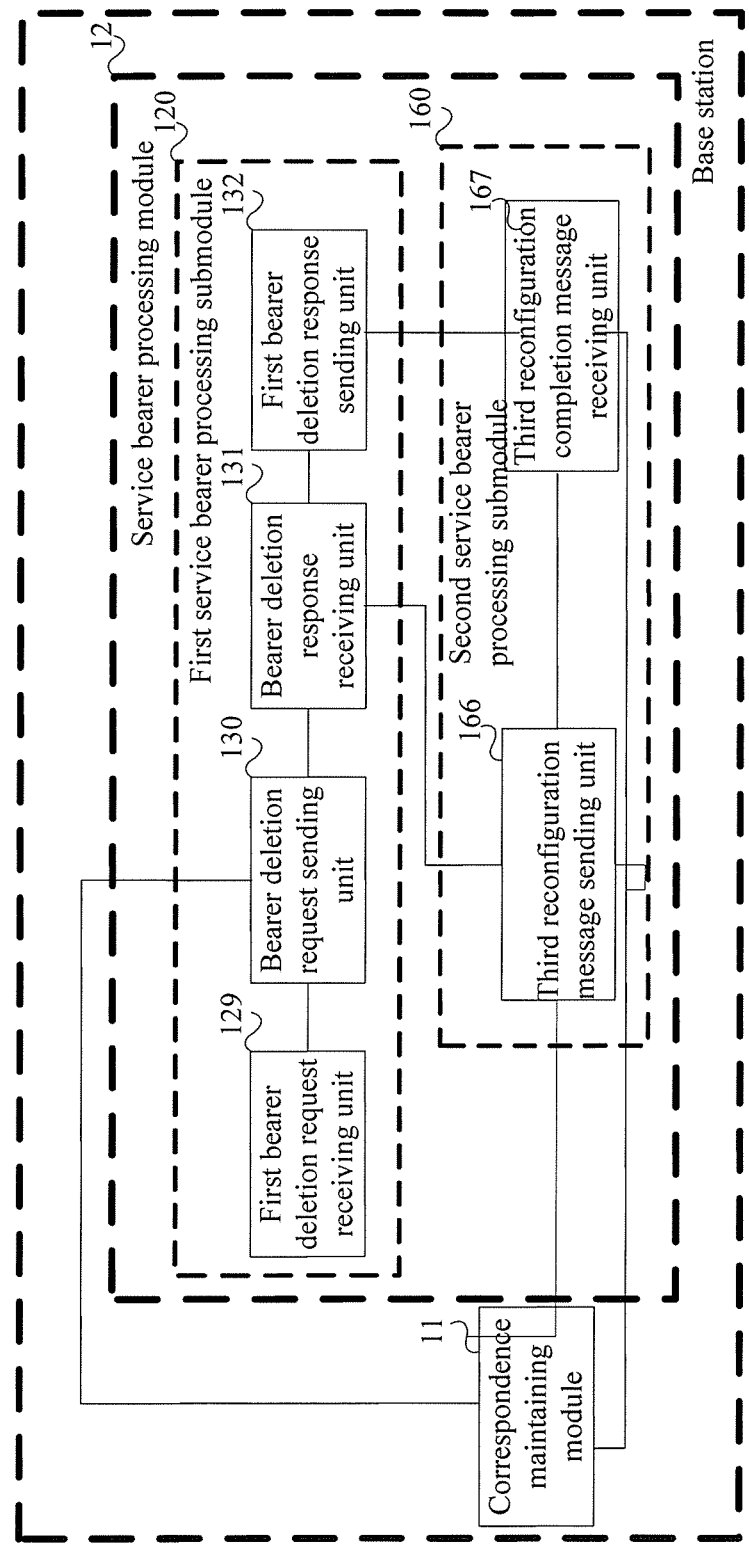
FIG. 4 is a schematic structural diagram of a base station according to still another embodiment of the present invention.

For another example, the service bearer procedure of the UE is a service bearer deletion procedure, the service bearer request message is a service bearer deletion request message, and the service bearer response message is a service bearer deletion response message. In this case, the first service bearer processing submodule 120 includes: a first bearer deletion request receiving unit 129, a bearer deletion request sending unit 130, a bearer deletion response receiving unit 131, and a first bearer deletion response sending unit 132. Accordingly, the second service bearer processing submodule 160 includes: a third reconfiguration message sending unit 166 and a third reconfiguration completion message receiving unit 167. FIG. 4 shows a structure corresponding to the base station of the embodiment.

The first bearer deletion request receiving unit 129 is configured to receive the service bearer deletion request message sent by a core network device, where the service bearer deletion request message includes an identifier of the UE and an identifier of a third service bearer. The third service bearer is a service bearer to be deleted. Optionally, the identifier of the third service bearer may be an E-RAB ID field in the service bearer deletion request message.

The bearer deletion request sending unit 130 is connected to the first bearer deletion request receiving unit 129 and the correspondence maintaining module 11, and is configured to acquire the identifier of the first target data base station from the correspondence maintaining module 11, and forward the service bearer deletion request message to the first target data base station according to the identifier of the first target data base station, so that the first target data base station performs a deletion procedure of the third service bearer.

A procedure for deleting the third service bearer by the first target data base station mainly includes: deleting an air interface DRB (the procedure is completed by using an RRC reconfiguration procedure), deleting an S1 bearer, and the like. The procedure for deleting the third service bearer by the first target data base station is basically the same as a procedure for deleting a service bearer in the prior art, and details are not described herein again.

The bearer deletion response receiving unit 131 is configured to receive the service bearer deletion response message sent by the first target data base station. The service bearer deletion response message mainly includes an identifier field of the message on a sending party, that is, an identifier of the UE at a first target data base station side, where the field is an MME UE S1AP ID field; an identifier field of the message on a receiving party, that is, an identifier field of the UE at a base station side of the embodiment, where the field is an eNB UE S1AP ID field; a list of E-RAB identifiers to be deleted (E-RAB To Be Released List); and other information. Optionally, the bearer deletion response receiving unit 131 is connected to the bearer deletion request sending unit 130 and configured to: after the bearer deletion request sending unit 130 sends the service bearer deletion request message, receive the service bearer deletion response message.

The first bearer deletion response sending unit 132 is configured to: after the bearer deletion response receiving unit 131 receives the service bearer deletion response message, send a response message indicating whether the service bearer is successfully deleted to the core network device. Optionally, the first bearer deletion response sending unit 132 is connected to the bearer deletion response receiving unit 131 and the third reconfiguration completion message receiving unit 167. The first bearer deletion response sending unit 132 may specifically send, after the bearer deletion response receiving unit 131 and the third reconfiguration completion message receiving unit 167 receive the service bearer deletion response message and a third RRC connection reconfiguration completion message respectively, a response message indicating whether the service bearer is successfully deleted to the core network device.

The third reconfiguration message sending unit 166 is connected to the bearer deletion response receiving unit 131 and configured to: after the bearer deletion response receiving unit 131 receives the service bearer deletion response message, send a third RRC connection reconfiguration message to the UE, so as to control the UE to modify a DRB configuration of the third service bearer. In a manner of the embodiment, the third RRC connection reconfiguration message includes a DRB deletion instruction. The DRB deletion instruction, on one hand, is used to instruct the UE to delete a DRB, and in addition, further includes an identifier of the DRB to be deleted.

Optionally, the third RRC connection reconfiguration message may further include an instruction of deleting the secondary node when a DRB corresponding to the third service bearer is the last DRB that is of the UE and needs to be deleted from the first target data base station, that is, after all DRBs of the UE on the first target data base station are deleted, a component carrier or a component carrier group of the first target data base station may be deleted from a component carrier list of the UE.

The third reconfiguration completion message receiving unit 167 is connected to the third reconfiguration message sending unit 166 and configured to receive the third RRC connection reconfiguration completion message, which is sent by the UE after processing of the deletion procedure of the third service bearer is complete.

The correspondence maintaining module 11 is specifically configured to delete a correspondence between the third service bearer and the first target data base station. Optionally, the correspondence maintaining module 11 is connected to the third reconfiguration completion message receiving unit 167 and configured to: after the third reconfiguration completion message receiving unit 167 receives the third RRC connection reconfiguration completion message, delete a correspondence between the third service bearer and the first target data base station.

For another example, the service bearer procedure is a service bearer switch-in procedure, the service bearer request message is a service bearer switch-in request message, and the service bearer response message is a service bearer switch-in response message. The service bearer switch-in procedure may be a procedure for switching a service bearer from the base station of the embodiment to the first target data base station, or may be a procedure for switching a service bearer from another target data base station to the first target data base station. In this case, the first service bearer processing submodule 120 may include: a first bearer switch-in request sending unit 133 and a bearer switch-in response receiving unit 134.

Figure 5:
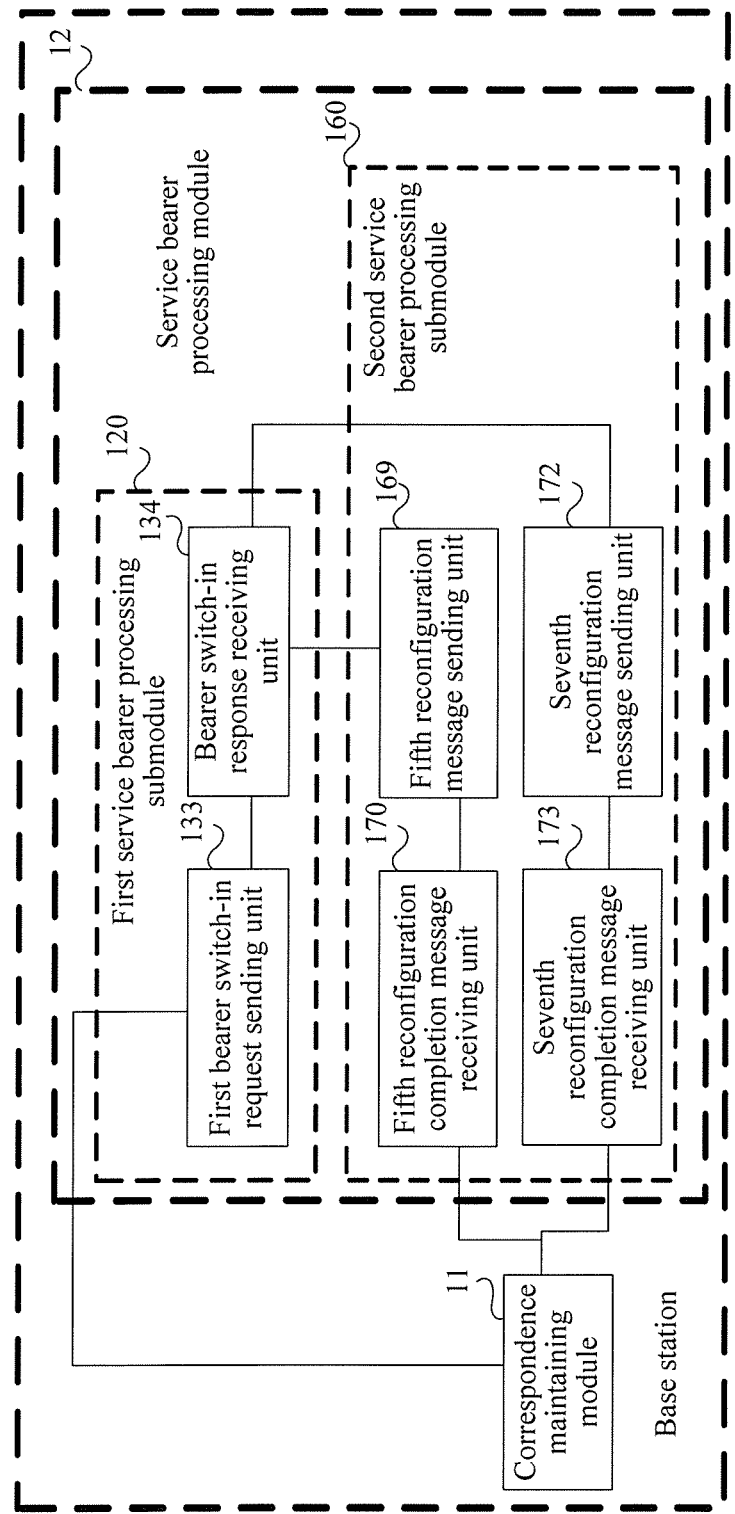
FIG. 5 is a schematic structural diagram of a base station according to still another embodiment of the present invention.

If the service bearer is switched from the another target data base station to the first target data base station, the second service bearer processing submodule 160 may include: a fifth reconfiguration message sending unit 169 and a fifth reconfiguration completion message receiving unit 170. If the service bearer is switched from the base station of the embodiment to the first target data base station, the second service bearer processing submodule 160 may include: a seventh reconfiguration message sending unit 172 and a seventh reconfiguration completion message receiving unit 173. FIG. 5 shows a structure corresponding to the base station of the embodiment. It is noted herein that the base station of the embodiment may include: the seventh reconfiguration message sending unit 172 and the seventh reconfiguration completion message receiving unit 173, or may include the fifth reconfiguration message sending unit 169 and the fifth reconfiguration completion message receiving unit 170. A specific implementation structure of the base station of the embodiment may be determined according to a service need.

The first bearer switch-in request sending unit 133 is connected to the correspondence maintaining module 11 and configured to acquire the identifier of the first target data base station from the correspondence maintaining module 11, and send the service bearer switch-in request message to the first target data base station according to the identifier of the first target data base station, so that the first target data base station establishes a context of the UE and information of a fourth service bearer, establishes a tunnel for forwarding the fourth service bearer, and configures a DRB on the first target data base station for the fourth service bearer. The fourth service bearer is a service bearer to be switched to the first target data base station.

The service bearer switch-in request message includes one piece of the following information: an identifier of the UE, an identifier and QoS information of the fourth service bearer, an address of a tunnel for transmitting uplink data of the fourth service bearer, and a DRB adding instruction; an identifier of the UE, an identifier and QoS information of the fourth service bearer, an address of a tunnel for transmitting uplink data of the fourth service bearer, a DRB adding instruction, and an access network identifier of the UE; an identifier of the UE, an identifier and QoS information of the fourth service bearer, an address of a tunnel for transmitting uplink data of the fourth service bearer, a DRB adding instruction, and adding an association relationship between an identifier of the added DRB and an identifier of a carrier or a carrier group on the first target data base station; and an identifier of the UE, an identifier and QoS information of the fourth service bearer, an address of a tunnel for transmitting uplink data of the fourth service bearer, a DRB adding instruction, an access network identifier of the UE, and adding an association relationship between an identifier of the added DRB and an identifier of a carrier or a carrier group on the first target data base station.

It can be seen from the above that the identifier of the UE, the identifier and the QoS information of the fourth service bearer, the address of the tunnel for transmitting the uplink data of the fourth service bearer, and the DRB adding instruction are mandatory information in the service bearer switch-in request message, while the access network identifier of the UE and the adding an association relationship between an identifier of the added DRB and an identifier of a carrier or a carrier group on the first target data base station are optional information.

The bearer switch-in response receiving unit 134 is configured to receive the service bearer switch-in response message, which is sent by the first target data base station after processing of a switch-in preparation procedure of the fourth service bearer is complete.

The service bearer switch-in response message includes one piece of the following information: an address of a tunnel for transmitting downlink data of the fourth service bearer; an address of a tunnel for transmitting downlink data of the fourth service bearer and a random access resource for the UE to access the first target data base station; an address of a tunnel for transmitting downlink data of the fourth service bearer and an address of a tunnel used for forwarding an unsuccessfully transmitted uplink and/or downlink data packet of the fourth service bearer; and an address of a tunnel for transmitting downlink data of the fourth service bearer, a random access resource for the UE to access the first target data base station, and an address of a tunnel used for forwarding an unsuccessfully transmitted uplink and/or downlink data packet of the fourth service bearer.

It can be seen from the above that the address of the tunnel for transmitting the downlink data of the fourth service bearer is mandatory information in the service bearer switch-in response message, while the random access resource for the UE to access the first target data base station and the address of the tunnel used for forwarding the unsuccessfully transmitted uplink and/or downlink data packet of the fourth service bearer are optional information.

For example, if the UE does not access the first target data base station before the bearer is switched to the first target data base station, the service bearer switch-in response message needs to include the random access resource for the UE to access the first target data base station; and otherwise, the service bearer switch-in response message does not need to include the random access resource for the UE to access the first target data base station.

For example, if the service bearer of the UE requires transmission with no packet lost, the service bearer switch-in response message needs to include the address of the tunnel used for forwarding the unsuccessfully transmitted uplink and/or downlink data packet of the fourth service bearer; and otherwise, the service bearer switch-in response message does not need to include the address of the tunnel used for forwarding the unsuccessfully transmitted uplink and/or downlink data packet of the fourth service bearer.

Optionally, the bearer switch-in response receiving unit 134 is connected to the first bearer switch-in request sending unit 133 and configured to: after the first bearer switch-in request sending unit 133 sends the service bearer switch-in request message, receive the service bearer switch-in response message.

In this example, the correspondence maintaining module 11 is further configured to select the first target data base station from a candidate data base station list of the UE for the fourth service bearer. After that, the correspondence maintaining module 11 provides the identifier of the first target data base station for the first bearer switch-in request sending unit 133.

The fifth reconfiguration message sending unit 169 is connected to the bearer switch-in response receiving unit 134 and configured to send a fifth RRC connection reconfiguration message to the UE, so as to control the UE to switch the fourth service bearer from a second target data base station to the first target data base station. The fifth RRC connection reconfiguration message includes an identifier of a carrier or a carrier group that is on the second target data base station and needs to be deleted from a component carrier of the UE, a need to add the identifier of the carrier or the carrier group on the first target data base station to the component carrier of the UE, and modifying an association relationship of a DRB of the fourth service bearer to an association relationship with the identifier of the carrier or the carrier group on the first target data base station.

It is noted herein that, before the fourth service bearer is switched from the second target data base station to the first target data base station, the DRB of the fourth service bearer is associated with the carrier or the carrier group on the second target data base station; and after being switched to the first target data base station, the DRB of the fourth service bearer needs to be associated with the carrier or the carrier group on the first target data base station. Specifically, the base station of the embodiment makes the fifth RRC connection reconfiguration message carry the modifying an association relationship of a DRB of the fourth service bearer to an association relationship with the identifier of the carrier or the carrier group on the first target data base station, to ensure that the DRB of the fourth service bearer needs to be associated with the carrier or the carrier group on the first target data base station.

The fifth reconfiguration completion message receiving unit 170 is connected to the fifth reconfiguration message sending unit 169 and configured to: after the fifth reconfiguration message sending unit 169 sends the fifth RRC connection reconfiguration message, receive a fifth RRC connection reconfiguration completion message, which is sent by the UE after processing of a switch-in procedure of the fourth service bearer is complete. The correspondence maintaining module 11 is specifically configured to update a correspondence between the fourth service bearer and the second target data base station to a correspondence between the fourth service bearer and the first target data base station. Optionally, the correspondence maintaining module 11 is connected to the fifth reconfiguration completion message receiving unit 170 and configured to: after the fifth reconfiguration completion message receiving unit 170 receives the fifth RRC connection reconfiguration completion message, update a correspondence between the fourth service bearer and the second target data base station to a correspondence between the fourth service bearer and the first target data base station.

The seventh reconfiguration message sending unit 172 is connected to the bearer switch-in response receiving unit 134 and configured to send a seventh RRC connection reconfiguration message to the UE, so as to control the UE to switch the fourth service bearer from the base station of the embodiment to the first target data base station. The seventh RRC connection reconfiguration message includes: adding an association relationship between an identifier of the DRB of the fourth service bearer and the identifier of the carrier or the carrier group on the first target data base station.

The seventh reconfiguration completion message receiving unit 173 is connected to the seventh reconfiguration message sending unit 172 and configured to: after the seventh reconfiguration message sending unit 172 sends the seventh RRC connection reconfiguration message, receive a seventh RRC connection reconfiguration completion message, which is sent by the UE after processing of a switch-in procedure of the fourth service bearer is complete.

The correspondence maintaining module 11 is specifically configured to add a correspondence between the fourth service bearer and the first target data base station. Optionally, the correspondence maintaining module 11 is connected to the seventh reconfiguration completion message receiving unit 173.

For another example, the service bearer procedure is a service bearer switch-out procedure, the service bearer request message is a service bearer switch-out request message, and the service bearer response message is a service bearer switch-out response message. The service bearer switch-out procedure may be a procedure for switching a service bearer from the first target data base station to the base station of the embodiment, or may be a procedure for switching from the base station of the embodiment to another basic-layer base station. In this case, the first service bearer processing submodule 120 may include: a first bearer switch-out request sending unit 135 and a bearer switch-out response receiving unit 136.

Figure 6:
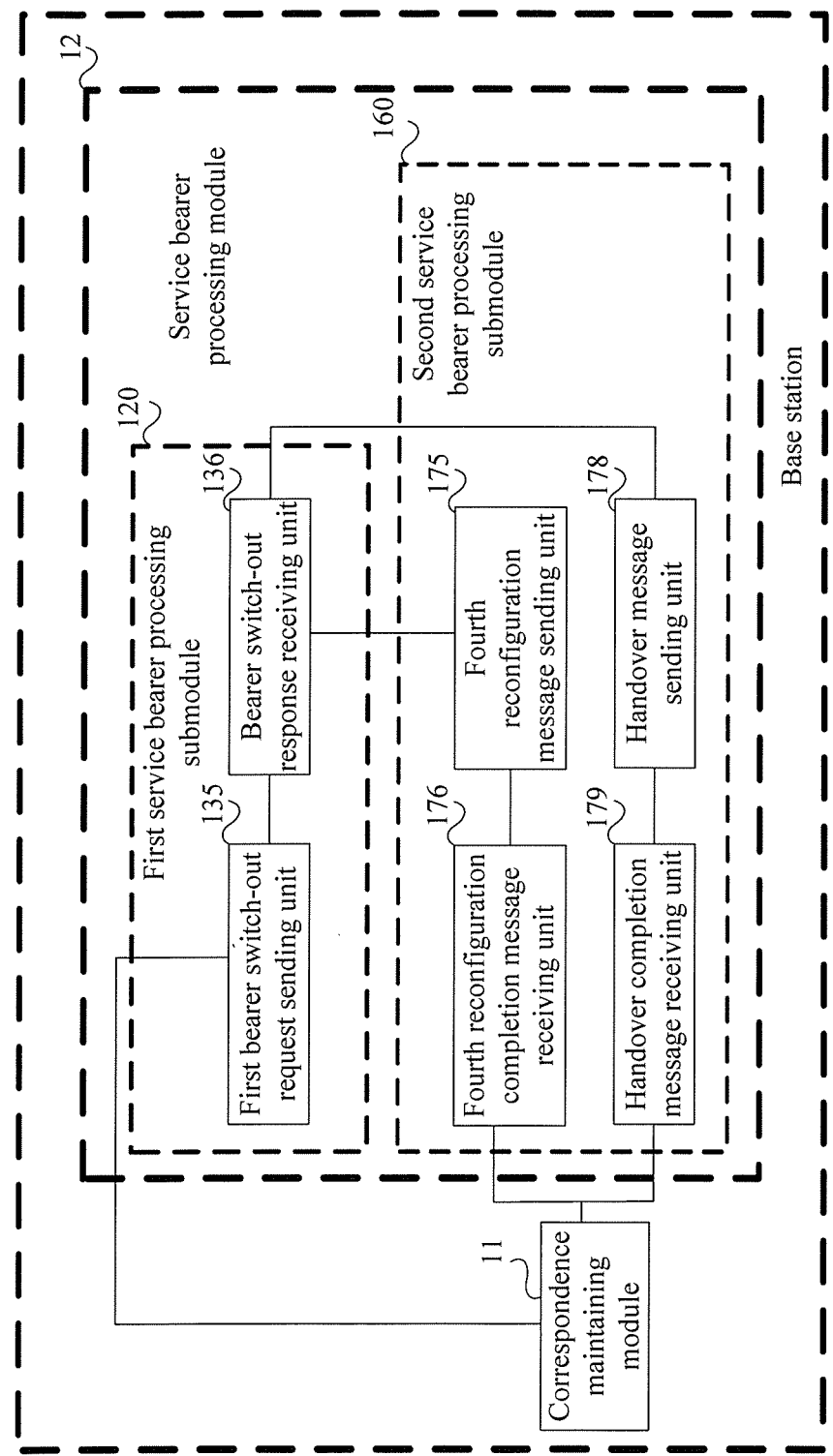
FIG. 6 is a schematic structural diagram of a base station according to still another embodiment of the present invention.

If the service bearer is switched from the first target data base station to the base station of the embodiment, the second service bearer processing submodule 160 may include: a fourth reconfiguration message sending unit 175 and a fourth reconfiguration completion message receiving unit 176. If the service bearer is switched from the base station of the embodiment to the another basic-layer base station, the second service bearer processing submodule 160 includes: a handover message sending unit 178 and a handover completion message receiving unit 179. FIG. 6 shows a structure corresponding to the base station of the embodiment. It is noted herein that the base station of the embodiment may include: the fourth reconfiguration message sending unit 175 and the fourth reconfiguration completion message receiving unit 176, or may include the handover message sending unit 178 and the handover completion message receiving unit 179. A specific implementation structure of the base station of the embodiment may be determined according to a service need.

The first bearer switch-out request sending unit 135 is connected to the correspondence maintaining module 11 and configured to acquire the identifier of the first target data base station from the correspondence maintaining module 11, and send the service bearer switch-out request message to the first target data base station according to the identifier of the first target data base station, so that the first target data base station performs switch-out processing on a fifth service bearer. The fifth service bearer is a service bearer to be switched out of the first target data base station. The service bearer switch-out request message includes one piece of the following information: an identifier of a UE and an identifier of the fifth service bearer; and an identifier of a UE, an identifier of the fifth service bearer, and an address of a tunnel used for forwarding an unsuccessfully transmitted uplink and/or downlink data packet of the fifth service bearer.

It can be seen from the above that the identifier of the UE and the identifier of the fifth service bearer are mandatory information in the service bearer switch-out request message, while the address of the tunnel used for forwarding the unsuccessfully transmitted uplink and/or downlink data packet of the fifth service bearer is optional. For example, if the service bearer of the UE requires transmission with no packet lost, the service bearer switch-out request message needs to include the address of the tunnel used for forwarding the unsuccessfully transmitted uplink and/or downlink data packet of the fifth service bearer; and otherwise, the service bearer switch-out request message does not need to include the address of the tunnel used for forwarding the unsuccessfully transmitted uplink and/or downlink data packet of the fifth service bearer.

The bearer switch-out response receiving unit 136 is configured to receive the service bearer switch-out response message, which is sent by the first target data base station after processing of a switch-out procedure of the fifth service bearer is complete. Optionally, the bearer switch-out response receiving unit 136 is connected to the first bearer switch-out request sending unit 135 and configured to: after the first bearer switch-out request sending unit 135 sends the service bearer switch-out request message, receive the service bearer switch-out response message.

The fourth reconfiguration message sending unit 175 is connected to the bearer switch-out response receiving unit 136 and configured to send a fourth RRC connection reconfiguration message to the UE, so as to control the UE to switch the fifth service bearer from the first target data base station to the base station of the embodiment. The fourth RRC connection reconfiguration message includes one piece of the following information: adding an association relationship between an identifier of a DRB of the fifth service bearer and an identifier of a carrier or a carrier group on the base station of the embodiment; and deleting an association relationship between an identifier of a DRB of the fifth service bearer and an identifier of a carrier or a carrier group on the first target data base station.

It is noted herein that, before the fifth service bearer is switched from the first target data base station to the base station of the embodiment, the DRB of the fifth service bearer is associated with the carrier or the carrier group on the first target data base station; and after the fifth service bearer is switched to the base station of the embodiment, the DRB of the fifth service bearer needs to be associated with the carrier or the carrier group on the base station of the embodiment. The following several manners may be used to associate the DRB of the fifth service bearer with the carrier or the carrier group on the base station of the embodiment:

carrying the adding an association relationship between an identifier of a DRB of the fifth service bearer and an identifier of a carrier or a carrier group on the base station of the embodiment in the fourth RRC connection reconfiguration message, so that the DRB of the fifth service bearer is associated with the carrier or the carrier group on the base station of the embodiment;

carrying the deleting an association relationship between an identifier of a DRB of the fifth service bearer and an identifier of a carrier or a carrier group on the first target data base station in the fourth RRC connection reconfiguration message; because by default a DRB of a service bearer of a UE is associated with a carrier or a carrier group on a basic-layer base station (that is, the base station of the embodiment) accessed by the UE, after the association relationship between an identifier of a DRB of the fifth service bearer and an identifier of a carrier or a carrier group on the first target data base station is deleted, the UE automatically associates the DRB of the fifth service bearer with the carrier or the carrier group on the base station of the embodiment; and carrying the adding an association relationship between an identifier of a DRB of the fifth service bearer and an identifier of a carrier or a carrier group on the base station of the embodiment, and the deleting an association relationship between an identifier of a DRB of the fifth service bearer and an identifier of a carrier or a carrier group on the first target data base station in the fourth RRC connection reconfiguration message, so that the DRB of the fifth service bearer is associated with the carrier or the carrier group on the base station of the embodiment.

The fourth reconfiguration completion message receiving unit 176 is connected to the fourth reconfiguration message sending unit 175 and configured to: after the fourth reconfiguration message sending unit 175 sends the fourth RRC connection reconfiguration message, receive a fourth RRC connection reconfiguration completion message, which is sent by the UE after processing of a switch procedure of the fifth service bearer is complete.

The correspondence maintaining module 11 is specifically configured to delete a correspondence between the fifth service bearer and the first target data base station. Optionally, the correspondence maintaining module 11 is connected to the fourth reconfiguration completion message receiving unit 176 and configured to: after the fourth reconfiguration completion message receiving unit 176 receives the fourth RRC connection reconfiguration completion message, delete a correspondence between the fifth service bearer and the first target data base station.

The handover message sending unit 178 is connected to the bearer switch-out response receiving unit 136 and configured to send a sixth RRC connection reconfiguration message to the UE, so as to control the UE to perform a handover to another base station.

The handover completion message receiving unit 179 is connected to the handover message sending unit 178 and configured to: after the handover message sending unit 178 sends the sixth RRC connection reconfiguration message, receive a handover completion message sent by the another base station, so as to delete a context of the UE. Optionally, after receiving an RRC connection reconfiguration completion message sent by the UE, the another base station sends the handover completion message to the base station of the embodiment.

A procedure for switching a service bearer from one basic-layer base station to another basic-layer base station is similar to a cross-domain handover procedure in the prior art, and details are not described herein.

Optionally, the correspondence maintaining module 11 is connected to the handover completion message receiving unit 179 and configured to: after the handover completion message receiving unit 179 receives the handover completion message, delete a correspondence between the fourth service bearer and the first target data base station.

Optionally, the correspondence maintaining module 11 may be further configured to receive an event report reported by a data base station that receives an uplink signal meeting a preset condition and is within a coverage scope of the base station, store a correspondence between an identifier of the data base station reporting the event report and the identifier of the UE to the candidate data base station list, and maintain the candidate data base station list; or the correspondence maintaining module 11 may be further configured to receive a measurement result, which is reported by the UE, of a data base station meeting a measurement criterion configured by the base station, store a correspondence between an identifier of the data base station in the measurement result and the identifier of the UE to the candidate data base station list, and maintain the candidate data base station list.

It can be seen from the above that the base station of the embodiment selects a target data base station from a candidate data base station list for a service bearer of a UE by maintaining the candidate data base station list of the UE, maintains a correspondence between the service bearer of the UE and the target data base station, and controls, according to specific implementation of a service bearer procedure, the target data base station and the UE to complete a corresponding service bearer procedure, which implements separation of a signaling plane and a user plane.

It is noted herein that the base station of the embodiment may have a part of or all functions that are described above. When the base station of the embodiment has multiple functions of the above at the same time, an implementation structure of the base station of the embodiment may be implemented by a combination of functional units corresponding to the functions. Preferably, in specific implementation, units having a same function may be implemented by a same unit, and units that implement different functions may be implemented separately. The following provides description by using an example that the base station of the embodiment has service bearer switch-in and service bearer switch-out functions at the same time. In this case, the base station of the embodiment may be implemented by a combination of FIG. 5 and FIG. 6. An exemplary implementation structure of the base station includes: a correspondence maintaining module 11 and a service bearer processing module 12, where the service bearer processing module 12 includes a first service bearer processing submodule 120 and a second service bearer processing submodule 160, where the first service bearer processing submodule 120 includes a first bearer switch-in request sending unit 133, a bearer switch-in response receiving unit 134, a first bearer switch-out sending unit 135, and a bearer switch-out response receiving unit 136, and the second service bearer processing submodule 160 may include one of the following combinations: a fifth reconfiguration message sending unit 169 and a fifth reconfiguration completion message receiving unit 170, a seventh configuration message sending unit 171 and a seventh reconfiguration completion message receiving unit 172, a fourth reconfiguration message sending unit 175 and a fourth reconfiguration completion message receiving unit 176, as well as a handover message sending unit 178 and a handover completion message receiving unit 179.

It is noted herein that, in addition to selecting a target data base station for a service bearer of a UE, maintaining a correspondence between the service bearer of the UE and the target data base station, and controlling the target data base station and the UE to complete processing of a service bearer procedure, the base station of the embodiment may further have the following functions: system information broadcasting; RRC connection management such as paging, RRC connection setup/modification/release, measurement configuration and reporting, and handover; transmission of a small amount of DRB data, control over data base station activation/deactivation; and the like. The function used by the base station of the embodiment to control a target data base station and a UE to complete processing of a service bearer procedure may be called a bearer management and interaction function between the base station of the embodiment and a data base station.

For example, a signaling connection of a UE, for example, non-access stratum (Non-Access Stratum, NAS) signaling between a bearer UE and an MME, reaches the MME by using the base station of the embodiment.

Figure 7:
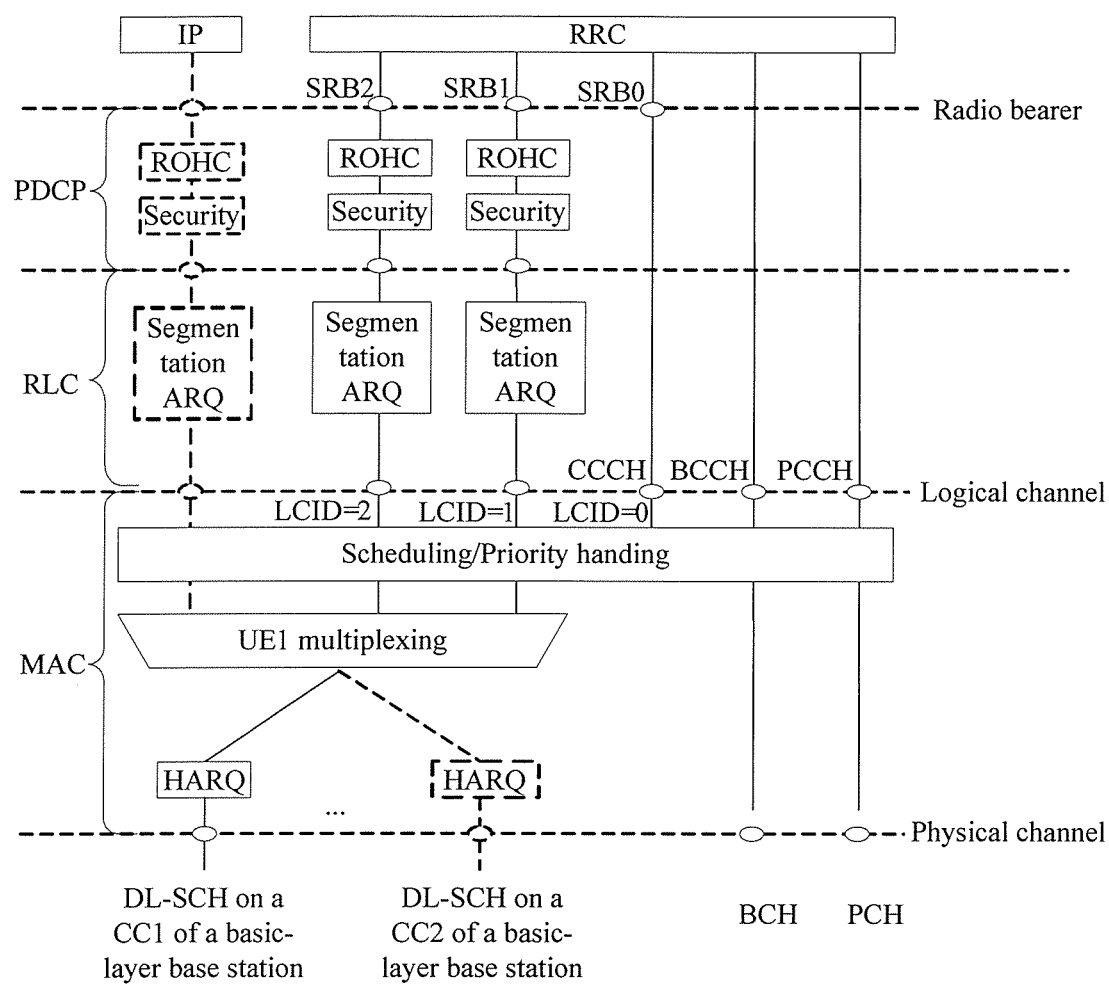
FIG. 7 is a schematic diagram of a protocol stack structure of a base station when downlink mapping is performed according to an embodiment of the present invention.

In an LTE system that is used as an example, a protocol stack of the base station of the embodiment includes an RRC layer/IP layer, a Packet Data Convergence Protocol (Packet Data Convergence Protocol, PDCP) layer, a Radio Link Control (Radio Link Control, RLC) layer, a MAC layer, and a physical layer from top to bottom. The PDCP layer mainly completes encryption and integrity protection functions, for example, by adopting robust header compression (Robust Header Compression, ROHC) and security (Security) technologies. The RLC layer mainly provides segmentation and retransmission services for a user and control data, for example, by adopting segmentation (Segm) and automatic repeat request (Automatic Repeat-reQuest, ARQ) technologies. The MAC layer mainly completes functions such as scheduling (scheduling), priority handling (Priority handing), UE multiplexing (Multiplexing), and hybrid automatic repeat request (Hybrid Automatic Repeat Request, HARQ). FIG. 7 shows a structure of a protocol stack of the base station of the embodiment when downlink mapping is performed, where a part indicated by a dashed box is used to take charge of DRB transmission and this part is optional. On the base station of the embodiment, for a downlink direction, all RRC functions in an RRC connection procedure of a UE are provided, for example, SRB0/1/2, a broadcast channel (Broadcast Channel, BCH), a paging channel (Paging Channel, PCH), a broadcast control channel (Broadcast Control Channel, BCCH) corresponding to a BCH, a paging control channel (Paging Control Channel, PCCH) corresponding to a PCH, and a common control channel (Common Control Channel, CCCH). As shown in FIG. 7, logical channel identifies (LCID) corresponding to SRB0/2/3 are 0, 1, and 2 respectively.

It is noted herein that, in addition to controlling a UE to perform a handover between data base stations within a coverage scope of the base station of the embodiment, the base station of the embodiment may further control a UE to perform a handover between data base station over coverage of different base stations. The handover procedure is similar to a handover procedure between cross-domain base stations in the prior art, and details are not described herein again.

The base station of the embodiment may control a UE to perform a handover between different data base stations, which further perfects a separation scheme of a signaling plane and a user plane in specific implementation.

Figure 8:
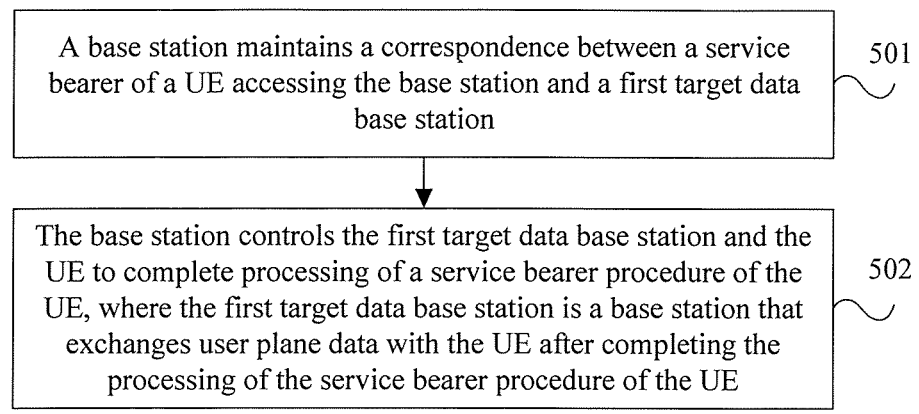
FIG. 8 is a flowchart of a communications method according to an embodiment of the present invention.

FIG. 8 is a flowchart of a communications method according to an embodiment of the present invention. As shown in FIG. 8, the method of the embodiment includes:

Step 501: A base station maintains a correspondence between a service bearer of a UE accessing the base station and a first target data base station.

Step 502: The base station controls the first target data base station and the UE to complete processing of a service bearer procedure of the UE, where the first target data base station is a base station that exchanges user plane data with the UE after completing the processing of the service bearer procedure of the UE. The base station of the embodiment refers to a basic-layer base station and is mainly responsible for signaling interaction of the UE, responsible for maintaining the correspondence between a service bearer of a UE and a first target data base station, controlling the first target data base station and the UE to complete the processing of the service bearer procedure, and then enabling the UE to perform data transmission through the first target data base station.

Optionally, on the base station, a candidate data base station list of the UE accessing the base station is maintained in advance.

Optionally, the base station of the embodiment can periodically broadcast a downlink channel, so as to enable a UE to access the base station. However, a data base station is incapable of broadcasting a downlink channel, so as to prevent UEs from directly accessing the data base station.

Optionally, the base station can receive an event report reported by a data base station that receives an uplink signal meeting a preset condition and is within a coverage scope of the base station, store a correspondence between an identifier of the data base station reporting the event report and an identifier of the UE to the candidate data base station list, and maintain the candidate data base station list.

Optionally, the base station can receive a measurement result, which is reported by the UE, of a data base station meeting a measurement criterion configured by the base station, store a correspondence between an identifier of the data base station in the measurement result and an identifier of the UE to the candidate data base station list, and maintain the candidate data base station list.

Optionally, an implementation manner of step 502 may include: controlling, by the base station, the first target data base station to perform the processing of the service bearer procedure; and controlling, by the base station, the UE to perform the processing of the service bearer procedure. The controlling, by the base station, the first target data base station to perform the processing of the service bearer procedure may be: acquiring, by the base station, an identifier of the first target data base station, sending a service bearer request message to the first target data base station according to the identifier of the first target data base station, so as to control the first target data base station to perform the processing of the service bearer procedure of the UE. The base station receives a service bearer response message that the first target data base station returns after completing the processing of the service bearer procedure. The controlling, by the base station, the UE to perform the processing of the service bearer procedure may be: sending, by the base station, an RRC connection reconfiguration message to the UE after receiving the service bearer response message, so as to control the UE to perform corresponding configuration for the service bearer procedure to complete the processing of the service bearer procedure.

In the embodiment, the base station of the embodiment is cooperated with a data base station. A correspondence between a service bearer of a UE and a data base station is maintained, and a target data base station and the UE are controlled to complete processing of a service bearer procedure, so as to implement user plane data exchange performed by the data base station and the UE, while the base station of the embodiment (that is, a basic-layer base station) is responsible for signaling transmission of a signaling plane, thereby implementing separation of a signaling plane and a user plane and solving an access problem of the UE in a case that overlapped coverage exists between a macro cell and a micro cell.

The foregoing service bearer procedure may include a service bearer setup procedure, a service bearer modification procedure, a service bearer deletion procedure, a service bearer switch-in procedure, a service bearer switch-out procedure, or the like. For different service bearer procedures, specific implementation of the controlling, by the base station of the embodiment, the first target data base station and the UE to complete processing of a service bearer procedure is different. The following provides detailed description for a specific service bearer procedure.

If a service bearer procedure is a service bearer setup procedure:

Optionally, a procedure for controlling, by a base station, a first target data base station to perform service bearer setup includes:

Step 600a: A base station receives a service bearer setup request message sent by a core network device, where the service bearer setup request message includes an identifier of a UE, an identifier of a first service bearer, and QoS information of the first service bearer, and the first service bearer is a service bearer to be set up.

Step 601a: The base station selects a first target data base station from a candidate data base station list of the UE for the first service bearer.

Step 601a is a specific implementation manner of acquiring, by the base station, an identifier of the first target data base station in the service bearer setup procedure.

Step 602a: The base station sends the service bearer setup request message including first information to the first target data base station according to the identifier of the first target data base station, so that the first target data base station establishes a context of the UE and information of the first service bearer, and configures a DRB on the first target data base station for the first service bearer.

In the embodiment, the first information may be added to the foregoing service bearer setup request message by the base station. The first information may include one piece of the following information: a DRB adding instruction; a DRB adding instruction and adding an association relationship between an identifier of an added DRB and an identifier of a carrier or a carrier group on the first target data base station; a DRB adding instruction and an access network identifier of the UE; and a DRB adding instruction, adding an association relationship between an identifier of an added DRB and an identifier of a carrier or a carrier group on the first target data base station, and an access network identifier of the UE.

Step 603a: The base station receives a service bearer setup response message, which is sent by the first target data base station after processing of a setup preparation procedure of the first service bearer is complete.

The service bearer setup response message includes one piece of the following information: information indicating whether the first service bearer is successfully set up; and information indicating whether the first service bearer is successfully set up, and a random access resource for the UE to access the first target data base station.

Step 604a: The base station sends, after receiving the service bearer setup response message, a response message indicating whether the service bearer is successfully set up to the core network device.

Based on the above, a procedure for controlling, by a base station, a UE to perform service bearer setup and maintaining a correspondence between a first service bearer of the UE and a first target data base station includes:

Step 601b: The base station sends a first RRC connection reconfiguration message to the UE, so as to control the UE to configure a DRB for setting up the first service bearer on the first target data base station.

The first RRC connection reconfiguration message includes the DRB adding instruction and the identifier of the carrier or the carrier group that is associated with the added DRB and is on the first target data base station.

Step 602b: The base station receives a first RRC connection reconfiguration completion message, which is sent by the UE after processing of a setup procedure of the first service bearer is complete.

Step 603b: The base station records a correspondence between the first service bearer and the first target data base station.

It is noted herein that, when both the first target data base station and the UE successfully perform relevant processing of the setup procedure of the first service bearer, it is regarded that the service bearer is successfully set up. Therefore, the base station may specifically send, after receiving the service bearer setup response message and the first RRC connection reconfiguration completion message, the response message indicating whether the service bearer is successfully set up to the core network device.

Figure 9A:
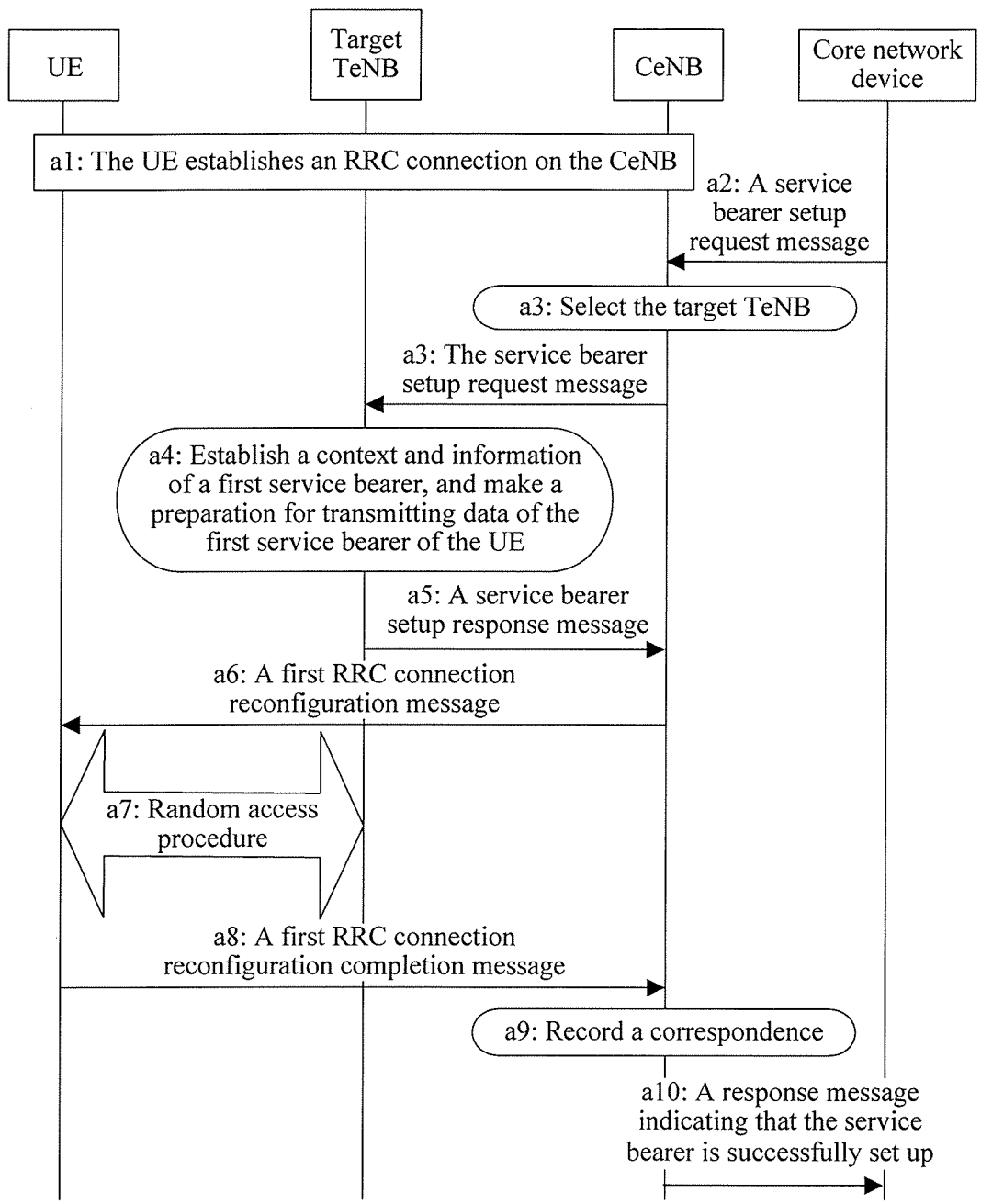
FIG. 9A is a flowchart of a detailed implementation procedure of a service bearer setup procedure according to an embodiment of the present invention.

FIG. 9A is a flowchart of a detailed implementation procedure of a service bearer setup procedure according to an embodiment of the present invention. As shown in FIG. 9A, the implementation procedure includes:

Step a1: A UE establishes an RRC connection on a CeNB.

The procedure of step a1 is similar to a procedure for establishing, by a UE, an RRC connection on a base station in the prior art, and details are not described herein again.

The base station of the embodiment is a basic-layer base station, that is, a base station that is mainly responsible for signaling interaction. To differentiate from a data base station, in the embodiment, a first target data base station is called a target TeNB and a base station is called a CeNB.

Step a2: The CeNB receives a service bearer setup request message sent by a core network device, where the service bearer setup request message includes an identifier of the UE and an identifier of a first service bearer.

In an LTE system, the service bearer setup request message may be an E-RAB setup Request. The first service bearer is a service bearer to be set up.

Step a3: The CeNB selects a target TeNB for the first service bearer of the UE and sends the service bearer setup request message to the target TeNB, so that the target TeNB establishes a context of the UE and information of the first service bearer, and configures a DRB on a first target data base station for the first service bearer.

The service bearer setup request message herein includes: the identifier of the UE, the identifier of the first service bearer, QoS information of the first service bearer, a DRB adding instruction, an identifier of a carrier or a carrier group that is associated with an added DRB and is on the first target data base station, an access network identifier of the UE, and other information.

Step a4: The target TeNB establishes the context for the UE and the information of the first service bearer according to the service bearer setup request message, and makes a preparation for transmitting data of the first service bearer of the UE.

Step a5: The target TeNB returns a service bearer setup response message to the CeNB.

In an LTE system, the service bearer setup response message may be an E-RAB Setup Response.

The service bearer setup response message includes information indicating whether the first service bearer is successfully set up, a random access resource for the UE to access the first target data base station, and other information.

Step a6: The CeNB sends a first RRC connection reconfiguration message to the UE, so as to control the UE to perform secondary node and DRB configuration for a setup procedure of the first service bearer and access the target TeNB.

The first RRC connection reconfiguration message includes the DRB adding instruction and the identifier of the carrier or the carrier group that is associated with the added DRB and is on the first target data base station.

In an LTE system, the first RRC connection reconfiguration message may be an RRC Connection Reconfiguration.

Step a7: The UE initiates a random access procedure to the target TeNB.

The procedure of step a7 is similar to a procedure for initiating, by a UE, a random access procedure to access a base station in the prior art, and details are not described again.

Step a7 is an optional step.

Step a8: The UE returns a first RRC connection reconfiguration completion message to the CeNB.

Step a7 and step a8 describe a MAC layer operation and an RRC layer operation respectively and do not have a strict time sequence.

Step a9: The CeNB records a correspondence between the first service bearer and the first target data base station and returns a response message indicating that the service bearer is successfully set up to the core network device.

Step a10: The core network device performs, through the target TeNB, transmission of data over the established first service bearer with the UE.

Further, data transmission between core network devices may be forwarded by a CeNB, or may directly occur between a core network device and a target TeNB.

Optionally, if the CeNB or the target TeNB supports a local IP access LIPA) function, data over the first service bearer may enter the Internet (Internet) directly from the CeNB or the target TeNB according to the information carried in the service bearer setup request message.

It is noted herein that for no matter in data transmission between the core network device and the target TeNB or in data transmission between the CeNB or the target TeNB and the Internet, their corresponding signaling plane interaction processes are the same, as shown in FIG. 9A, and a difference is that content carried in some messages is different.

In the embodiment, a CeNB selects a target TeNB for a UE and controls the target TeNB and the UE to perform processing of a service bearer setup procedure, thereby laying a foundation for the target TeNB to take charge of transmitting data in a service bearer of the UE. The foregoing procedure shows that the CeNB of the embodiment is responsible for signaling interaction of a UE, while a target TeNB is responsible for data transmission of a UE, thereby implementing separation of a signaling plane and a user plane.

If a service bearer procedure is a service bearer modification procedure:

Optionally, controlling, by a base station, a first target data base station to perform a service bearer modification procedure includes:

Step 701a: A base station receives a service bearer modification request message sent by a core network device, where the service bearer modification request message includes an identifier of a UE, an identifier of a second service bearer, and QoS information of the second service bearer, and the second service bearer is a service bearer to be modified.

Step 702*a*: The base station acquires an identifier of a first target data base station from a correspondence, and sends the service bearer modification request message including a DRB modification instruction to the first target data base station according to the identifier of the first target data base station, so that the first target data base station modifies information of the second service bearer and a DRB configuration of the second service bearer on the first target data base station.

The foregoing DRB modification instruction may be added to the foregoing service bearer modification request message by the base station.

The correspondence in step 702*a* is a correspondence that is between the second service bearer and the first target data base station and is maintained by the base station.

Step 703*a*: The base station receives a service bearer modification response message, which is sent by the first target data base station after processing of a modification procedure of the second service bearer is complete.

Step 704*a*: The base station sends, after receiving the service bearer modification response message, a response message indicating whether the service bearer is successfully modified to the core network device.

Optionally, a procedure for controlling, by a base station, a UE to perform service bearer modification includes:

Step 701*b*: A base station sends a second RRC connection reconfiguration message to a UE, so that the UE modifies a DRB configuration of a second service bearer, where the second RRC connection reconfiguration message includes the DRB modification instruction.

Step 702*b*: The base station receives a second RRC connection reconfiguration completion message, which is sent by the UE after processing of a modification procedure of the second service bearer is complete.

It is noted herein that, when both the first target data base station and the UE successfully perform relevant processing of the modification procedure of the second service bearer, it is regarded that the service bearer is successfully modified. Therefore, the base station may specifically send, after receiving the service bearer modification response message and the second RRC connection reconfiguration completion message, the response message indicating whether the service bearer is successfully modified to the core network device.

Figure 9B:
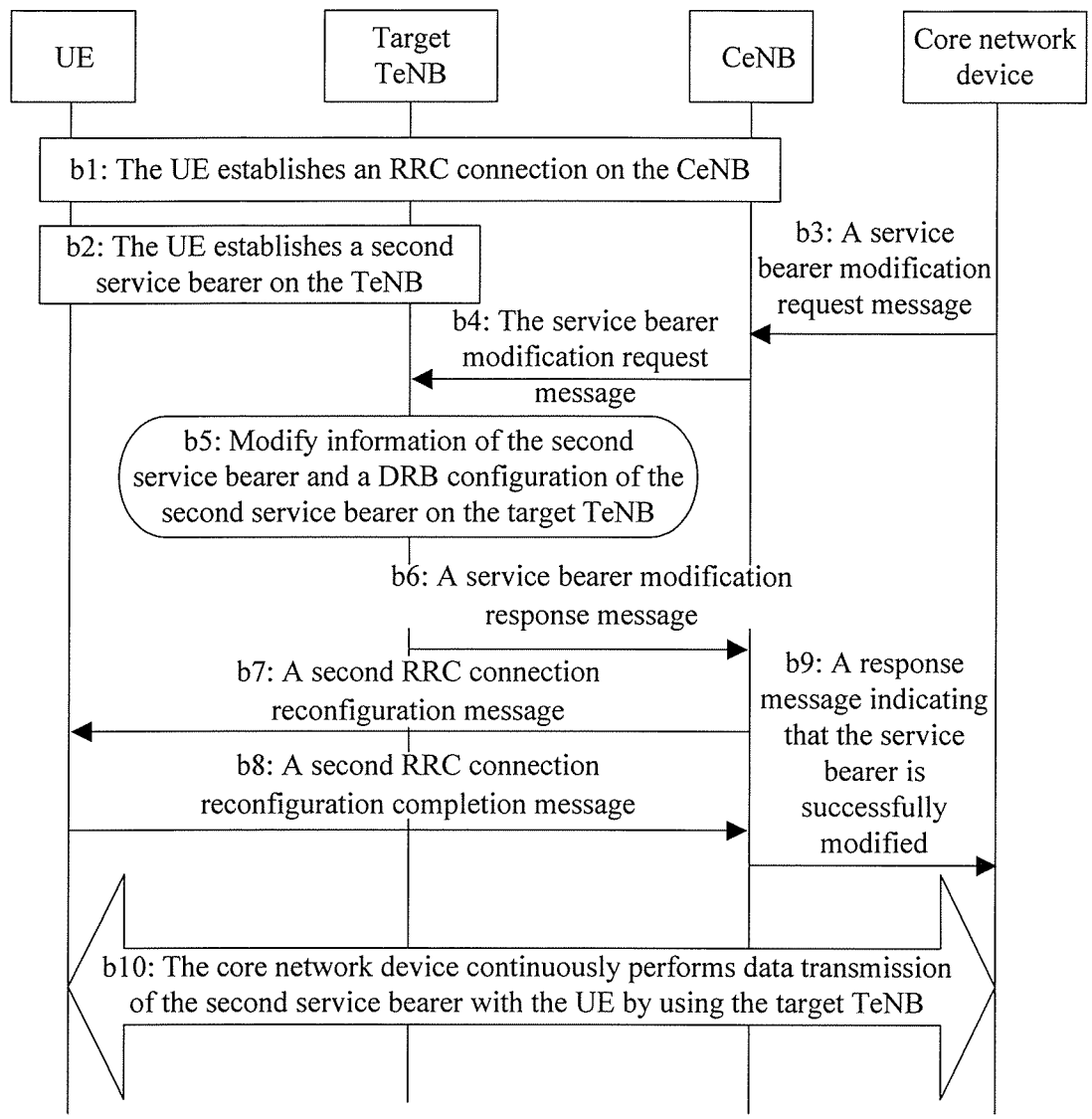
FIG. 9B is a flowchart of a detailed implementation procedure of a service bearer modification procedure according to an embodiment of the present invention.

FIG. 9B is a flowchart of a detailed implementation procedure of a service bearer modification procedure according to an embodiment of the present invention. As shown in FIG. 9B, the method of the embodiment includes:

Step b1: A UE establishes an RRC connection on a CeNB.

The base station of the embodiment is a basic-layer base station, that is, a base station that is mainly responsible for signaling interaction. To differentiate from a data base station, in the embodiment, a first target data base station is called a target TeNB and a base station is called a CeNB.

Step b2: The UE sets up a second service bearer on a target TeNB.

For a specific implementation procedure of step b2, reference may be made to the description of the embodiment shown in FIG. 9A. Specifically, step a2 to step a10 are a specific implementation manner of step b2.

Step b3: The CeNB receives a service bearer modification request message sent by a core network device, where the service bearer modification request message includes an identifier of the UE, an identifier of the second service bearer, and QoS information of the second service bearer.

In an LTE system, the service bearer modification request message may be an E-RAB Modify Request. The second service bearer is a service bearer to be modified.

Step b4: The CeNB sends the service bearer modification request message to a corresponding target TeNB according to the correspondence between the second service bearer and a target TeNB, so that the target TeNB modifies information of the second service bearer and a DRB configuration of the second service bearer on the target TeNB.

The service bearer modification request message herein includes: the identifier of the UE, the identifier of the second service bearer, modifying the QoS information of the second service bearer, modifying the DRB configuration of the second service bearer on the target TeNB, and other information.

Step b5: The target TeNB modifies the information of the second service bearer and the DRB configuration of the second service bearer on the target TeNB according to the service bearer modification request message.

Step b6: The target TeNB returns a service bearer modification response message to the CeNB.

In an LTE system, the service bearer modification response message may be an E-RAB Modify Response.

Step b7: The CeNB sends a second RRC connection reconfiguration message to the UE, so that the UE modifies the DRB configuration of the second service bearer.

The second RRC connection reconfiguration message includes a DRB modification instruction.

Step b8: The CeNB receives a second RRC connection reconfiguration completion message returned by the UE.

Step b9: The CeNB returns a response message indicating that the service bearer is successfully modified to the core network device.

Step b10: The core network device continuously performs data transmission of the second service bearer with the UE by using the target TeNB.

The foregoing procedure shows that, in a service bearer modification procedure, the CeNB of the embodiment is mainly responsible for signaling interaction of a UE, and controls the UE and a target TeNB to perform corresponding processing of service bearer modification, so as to complete a modification procedure of a service bearer, thereby implementing separation of a signaling plane and a user plane in a service bearer modification procedure.

If a service bearer procedure is a service bearer deletion procedure:

Optionally, a procedure for controlling, by a base station, a first target data base station to perform service bearer deletion includes:

Step 801*a*: A base station receives a service bearer deletion request message sent by a core network device, where the service bearer deletion request message includes an identifier of a UE and an identifier of a third service bearer, and the third service bearer is a service bearer to be deleted.

Step 802*a*: The base station acquires an identifier of a first target data base station from a correspondence, and forwards the service bearer deletion request message to the first target data base station according to the identifier of the first target data base station, so that the first target data base station performs a deletion procedure of the third service bearer.

The correspondence in step 802*a* is a correspondence that is between the third service bearer and the first target data base station and is maintained by the base station.

Step 803*a*: The base station receives a service bearer deletion response message sent by the first target data base station.

Step 804*a*: The base station sends, after receiving the service bearer deletion response message, a response message indicating whether the service bearer is successfully deleted to the core network device.

Optionally, a procedure for controlling, by a base station, a UE to perform service bearer deletion and maintaining a correspondence between a third service bearer of the UE and a first target data base station includes:

Step 801b: A base station sends a third RRC connection reconfiguration message to a UE, so as to control the UE to delete a DRB configuration of a third service bearer, where the third RRC connection reconfiguration message includes a DRB deletion instruction.

Step 802b: The base station receives a third RRC connection reconfiguration completion message, which is sent by the UE after processing of a deletion procedure of the third service bearer is complete.

Step 803b: The base station deletes a correspondence between the third service bearer and the first target data base station.

It is noted herein that, when both the first target data base station and the UE successfully perform relevant processing of the deletion procedure of the third service bearer, it is regarded that the service bearer is successfully deleted. Therefore, the base station may specifically send, after receiving the service bearer deletion response message and the third RRC connection reconfiguration completion message, the response message indicating whether the service bearer is successfully deleted to the core network device.

Figure 9C:
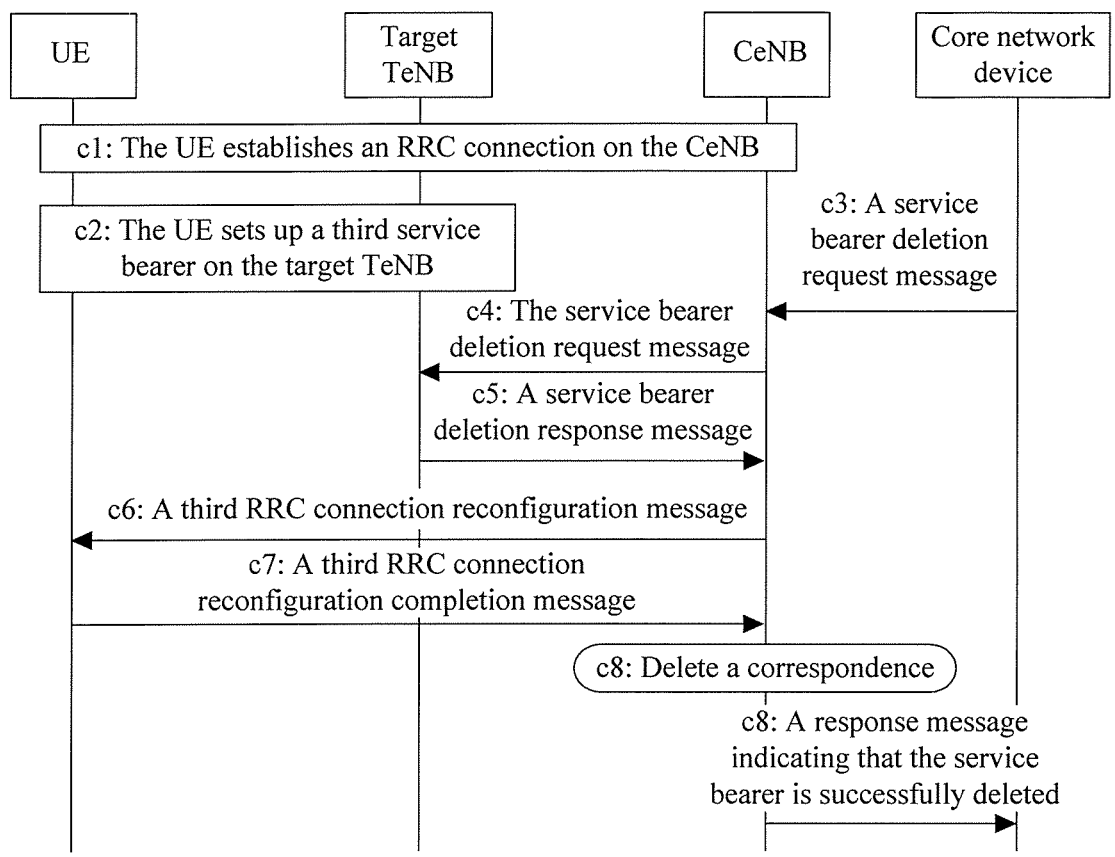
FIG. 9C is a flowchart of a detailed implementation procedure of a service bearer deletion procedure according to an embodiment of the present invention.

FIG. 9C is a flowchart of a detailed implementation procedure of a service bearer deletion procedure according to an embodiment of the present invention. As shown in FIG. 9C, the implementation procedure includes:

Step c1: A UE establishes an RRC connection on a CeNB.

The base station of the embodiment is a basic-layer base station, that is, a base station that is mainly responsible for signaling interaction. To differentiate from a data base station, in the embodiment, a first target data base station is called a target TeNB and a base station is called a CeNB.

Step c2: The UE sets up a third service bearer on a target TeNB.

For a specific implementation procedure of step c2, reference may be made to the description of the embodiment shown in FIG. 9A. Specifically, step a2 to step a10 are a specific implementation manner of step c2.

Step c3: The CeNB receives a service bearer deletion request message sent by a core network device, where the service bearer deletion request message includes an identifier of the UE and an identifier of the third service bearer.

In an LTE system, the service bearer deletion request message may be an E-RAB Release Command. The third service bearer is a service bearer to be deleted.

Step c4: The CeNB sends the service bearer deletion request message to the target TeNB, so that the target TeNB performs a deletion procedure of the third service bearer.

Step c5: The target TeNB returns a service bearer deletion response message to the CeNB.

In an LTE system, the service bearer deletion response message may be an E-RAB Release Response.

In step c5, the target TeNB performs a service bearer deletion operation. The operation is similar to a service bearer deletion operation performed by a base station in the prior art, and details are not described herein again.

Step c6: The CeNB sends a third RRC connection reconfiguration message to the UE, so as to control the UE to delete a DRB configuration of the third service bearer, where the third RRC connection reconfiguration message includes a DRB deletion instruction and an identifier of a DRB to be deleted.

In an LTE system, the third RRC connection reconfiguration message may be an RRC Connection Reconfiguration.

Step c7: The UE returns a third RRC connection reconfiguration completion message to the CeNB.

In an LTE system, the third RRC connection reconfiguration message may be an RRC Connection Complete.

Step c8: The CeNB deletes a correspondence between the third service bearer and the target TeNB and sends a response message indicating that the service bearer is successfully deleted to the core network device.

The foregoing procedure shows that, in a service bearer deletion procedure, a CeNB is mainly responsible for signaling interaction of a UE, and controls the UE and a target TeNB to perform corresponding processing of service bearer deletion, so as to complete deletion of a service bearer, thereby implementing separation of a signaling plane and a user plane in a service bearer deletion procedure.

In a communication procedure, as a UE moves and the like, a CeNB or a TeNB that the UE accesses may change; and in this case, a handover between different CeNBs or TeNBs is involved. For a service bearer, a CeNB or TeNB handover means that the service bearer is switched out of a CeNB or a TeNB or switched to a CeNB or a TeNB. Therefore, the communications method provided by the embodiments of the present invention further includes: performing processing of a service bearer switch-in procedure and a service bearer switch-out procedure.

If a service bearer procedure is a service bearer switch-in procedure:

Optionally, a procedure for controlling, by a base station, a first target data base station to perform processing on a service bearer switch-in procedure includes:

Step 900a: A base station selects a first target data base station from a candidate data base station list of a UE for a fourth service bearer.

Step 901a: The base station sends a service bearer switch-in request message to the first target data base station according to an identifier of the first target data base station, so that the first target data base station establishes a context of the UE and information of the fourth service bearer, establishes a tunnel for forwarding the fourth service bearer, and configures a DRB on the first target data base station for the fourth service bearer, where the fourth service bearer is a service bearer to be switched to the first target data base station.

The service bearer switch-in request message includes one piece of the following information: an identifier of the UE, an identifier and QoS information of the fourth service bearer, an address of a tunnel for transmitting uplink data of the fourth service bearer, and a DRB adding instruction; an identifier of the UE, an identifier and QoS information of the fourth service bearer, an address of a tunnel for transmitting uplink data of the fourth service bearer, a DRB adding instruction, and an access network identifier of the UE; an identifier of the UE, an identifier and QoS information of the fourth service bearer, an address of a tunnel for transmitting uplink data of the fourth service bearer, a DRB adding instruction, and adding an association relationship between an identifier of an added DRB and an identifier of a carrier or a carrier group on the first target data base station; and an identifier of the UE, an identifier and QoS information of the fourth service bearer, an address of a tunnel for transmitting uplink data of the fourth service bearer, a DRB adding instruction, an access network identifier of the UE, and adding an association relationship between an identifier of an added DRB and an identifier of a carrier or a carrier group on the first target data base station.

Step 902a: The base station receives a service bearer switch-in response message, which is sent by the first target data base station after processing of a switch-in preparation procedure of the fourth service bearer is complete.

The service bearer switch-in response message includes one piece of the following information: an address of a tunnel for transmitting downlink data of the fourth service bearer; an address of a tunnel for transmitting downlink data of the fourth service bearer and a random access resource for the UE to access the first target data base station; an address of a tunnel for transmitting downlink data of the fourth service bearer and an address of a tunnel used for forwarding an unsuccessfully transmitted uplink and/or downlink data packet of the fourth service bearer; and an address of a tunnel for transmitting downlink data of the fourth service bearer, a random access resource for the UE to access the first target data base station, and an address of a tunnel used for forwarding an unsuccessfully transmitted uplink and/or downlink data packet of the fourth service bearer.

The foregoing fourth service bearer may be switched from a second target data base station to the first target data base station. In this case, a process for controlling, by a base station, a UE to process a service bearer switch-in procedure includes:

Step 901b: A base station sends a fifth RRC connection reconfiguration message to a UE, so as to control the UE to switch a fourth service bearer from a second target data base station to a first target data base station.

The fifth RRC connection reconfiguration message includes an identifier of a carrier or a carrier group that is on the second target data base station and needs to be deleted from a component carrier of the UE, an identifier of a carrier or a carrier group that is on the first target data base station and needs to be added to the component carrier of the UE, and modifying an association relationship of a DRB of the fourth service bearer to an association relationship with the identifier of the carrier or the carrier group on the first target data base station.

Step 902b: The base station receives a fifth RRC connection reconfiguration completion message, which is sent by the UE after processing of a switch procedure of the fourth service bearer is complete.

Step 903b: The base station updates a correspondence between the fourth service bearer and the second target data base station to a correspondence between the fourth service bearer and the first target data base station.

Optionally, the foregoing fourth service bearer may be switched from the base station of the embodiment to the first target data base station. In this case, a process for controlling, by a base station, a UE to process a service bearer switch-in procedure includes:

Step 901c: A base station sends a seventh RRC connection reconfiguration message to a UE, so as to control the UE to switch a fourth service bearer from the base station to a first target data base station, where the seventh RRC connection reconfiguration message includes: adding an association relationship between an identifier of a DRB of the fourth service bearer and an identifier of a carrier or a carrier group on the first target data base station.

Step 902c: The base station receives a seventh RRC connection reconfiguration completion message, which is sent by the UE after processing of a switch procedure of the fourth service bearer is complete.

Step 903c: The base station records a correspondence between the fourth service bearer and the first target data base station.

If a service bearer procedure is a procedure for switching out a service bearer and maintaining a correspondence between a UE and a fourth service bearer:

Optionally, a processing process for controlling, by a base station, a first target data base station to perform a service bearer switch-out procedure includes:

Step 901d: A base station acquires an identifier of a first target data base station from a correspondence, and sends a service bearer switch-out request message to the first target data base station according to the identifier of the first target data base station, so that the first target data base station performs switch-out processing on a fifth service bearer, where the fifth service bearer is a service bearer to be switched out of the first target data base station.

The correspondence in step 901d is a correspondence that is between the fifth service bearer and the first target data base station and is maintained by the base station.

The service bearer switch-out request message includes one piece of the following information: an identifier of a UE and an identifier of the fifth service bearer; and an identifier of a UE, an identifier of the fifth service bearer, and an address of a tunnel used for forwarding an unsuccessfully transmitted uplink and/or downlink data packet of the fifth service bearer.

Step 902d: The base station receives a service bearer switch-out response message, which is sent by the first target data base station after processing of a switch-out procedure of the fifth service bearer is complete.

Optionally, the foregoing service bearer may be switched from the first target base station to the base station of the embodiment. In this case, a process for controlling, by a base station, a UE to process a service bearer switch-in procedure and maintaining a correspondence between a fifth service bearer of the UE and a first target data base station includes:

Step 901e: A base station sends a fourth RRC connection reconfiguration message to a UE, so as to control the UE to switch a fifth service bearer from a first target data base station to the base station.

The fourth RRC connection reconfiguration message includes one piece of the following information: adding an association relationship between an identifier of a DRB of the fifth service bearer and an identifier of a carrier or a carrier group on the base station of the embodiment; and deleting an association relationship between an identifier of a DRB of the fifth service bearer and an identifier of a carrier or a carrier group on the first target data base station.

Step 902e: The base station receives a fourth RRC connection reconfiguration completion message, which is sent by the UE after processing of a switch procedure of the fifth service bearer is complete.

Step 903e: The base station deletes a correspondence between the fifth service bearer and the first target data base station.

Optionally, the foregoing service bearer may be switched from the base station of the embodiment to another base station (referred to as a basic-layer base station herein). In this case, a process for controlling, by a base station, a UE to process a service bearer switch-in procedure and maintaining a correspondence between a fifth service bearer of the UE and a first target data base station includes:

Step 901f: A base station sends a sixth RRC connection reconfiguration message to a UE, so as to control the UE to perform a handover to another base station.

Step 902f: The base station receives a handover completion message sent by the other base station, so as to delete a context of the UE.

Figure 9D:
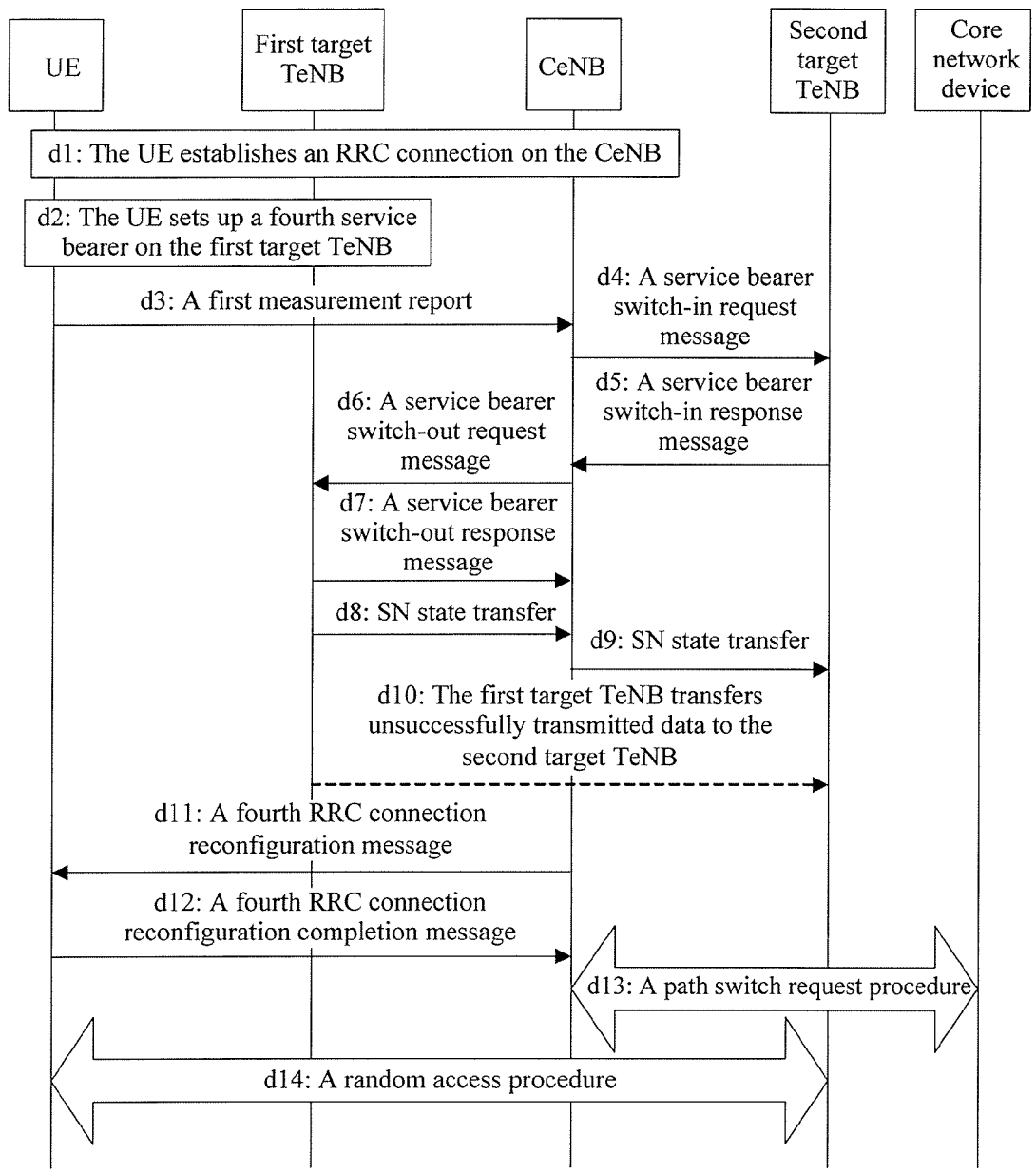
FIG. 9D is a flowchart of performing a TeNB handover inside a CeNB according to an embodiment of the present invention.

FIG. 9D is a flowchart of performing a TeNB handover inside a CeNB according to an embodiment of the present invention. As shown in FIG. 9D, the method of the embodiment includes:

Step d1: A UE establishes an RRC connection on a CeNB.

The base station of the embodiment is a basic-layer base station, that is, a base station that is mainly responsible for signaling interaction. To differentiate from a data base station, in the embodiment, a first target data base station is called a first target TeNB, a base station is called a CeNB, and a second target data base station is called a second target TeNB. In the embodiment, the first target TeNB and the second target TeNB are TeNBs covered by a same CeNB.

Step d2: The UE sets up a fourth service bearer on a first target TeNB.

For a specific implementation procedure of step d2, reference may be made to the description of the embodiment shown in FIG. 9A. Specifically, step a2 to step a10 are a specific implementation manner of step d2.

Step d3: The CeNB receives a first measurement report reported by the UE and selects a second target TeNB for the UE according to the first measurement report.

Step d4: The CeNB sends a service bearer switch-in request message to the second target TeNB, so that the second target TeNB establishes a context of the UE and information of the fourth service bearer, establishes a tunnel for forwarding the fourth service bearer, and configures a DRB on the second target TeNB for the fourth service bearer.

In an LTE system, the service bearer switch-in request message may be an E-RAB Switch-in Request. It is noted herein that, for the second target TeNB, the fourth service bearer is a service bearer to be switched in.

Step d5: The second target TeNB sends a service bearer switch-in response message to the CeNB.

In an LTE system, the service bearer switch-in response message may be an E-RAB Switch-in Response.

Step d6: A base station sends a service bearer switch-out request message to the first TeNB, so that the first target TeNB performs switch-out processing on the fourth service bearer.

In an LTE system, the service bearer switch-out request message may be an E-RAB Switch-Out Request. It is noted herein that, for the first target TeNB, the fourth service bearer is a service bearer to be switched out.

Step d7: The first target TeNB sends a service bearer switch-out response message to the CeNB.

In an LTE system, the service bearer switch-out response message may be an E-RAB Switch-Out Response.

Step d8: The first target TeNB sends an SN state transfer message to the CeNB.

Step d9: The CeNB sends the SN state transfer message to the second target TeNB.

Step d10: The first target TeNB transfers unsuccessfully transmitted data to the second target TeNB according to an address of the forwarding tunnel.

Herein, the unsuccessfully transmitted data includes data of bearers.

Step d11: The CeNB sends a fourth RRC connection reconfiguration message to the UE, so as to control the UE to re-perform corresponding configuration for the fourth service bearer.

Step d12: The CeNB receives a fourth RRC connection reconfiguration completion message sent by the UE.

Optionally, as shown FIG. 9D, after step d12, the method further includes:

Step d13: The CeNB performs a path switch request (path switch request) procedure with a core network device.

After step d12, the method further includes:

Step d14: The UE initiates a random access procedure to the second target TeNB.

A time sequence between step d12 and step d14 is not limited.

The foregoing procedure shows that the CeNB of the embodiment controls a UE to perform a handovers between different target TeNBs, thereby implementing a handover of a target TeNB and further enriching a scheme for separation of a CeNB and a TeNB.

Figure 9E:
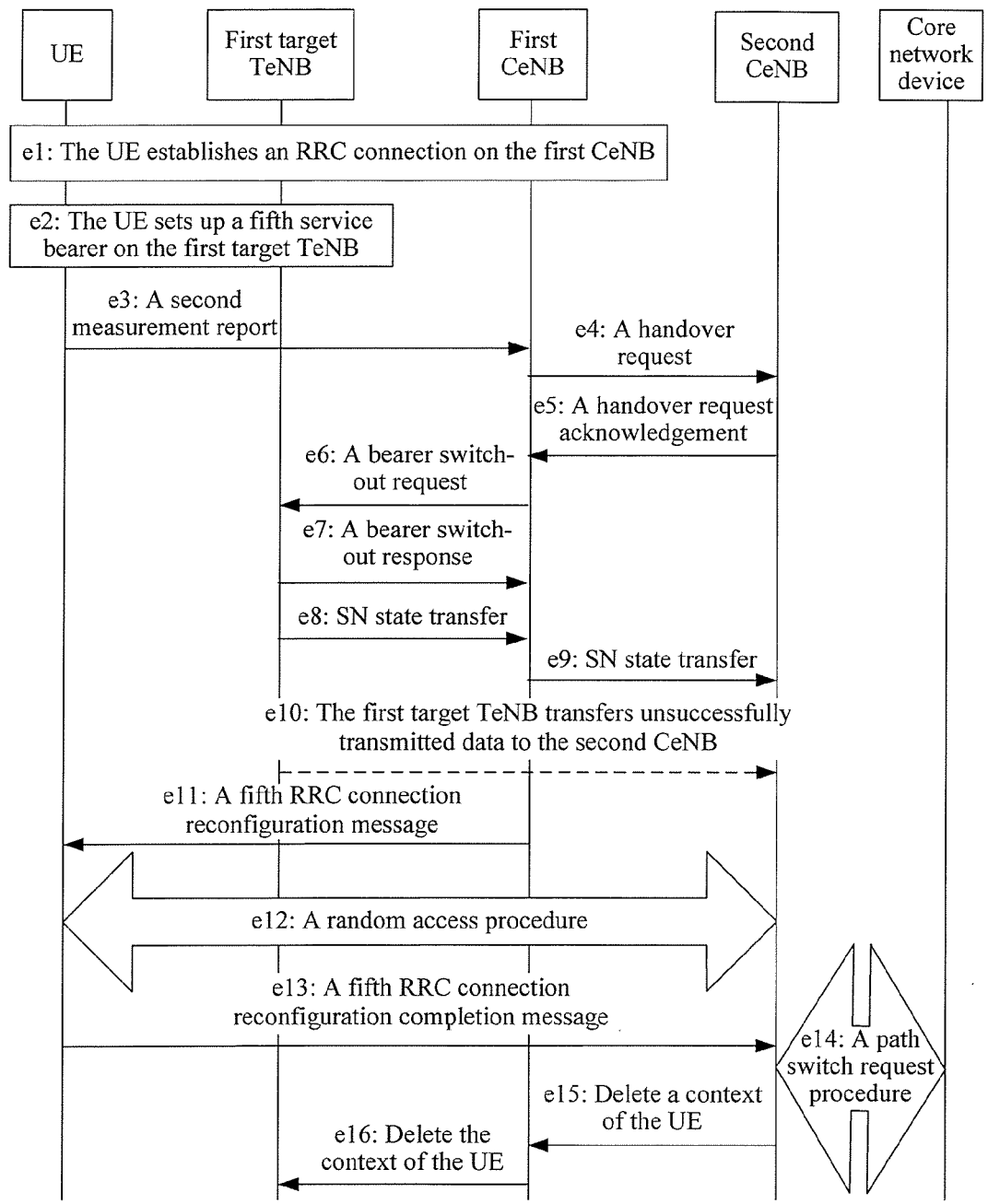
FIG. 9E is a flowchart of a UE service bearer handover procedure between different CeNBs according to an embodiment of the present invention.

FIG. 9E is a flowchart of a UE service bearer handover procedure between different CeNBs according to an embodiment of the present invention. As shown in FIG. 9E, the method of the embodiment includes:

Step e1: A UE establishes an RRC connection on a first CeNB.

The base station of the embodiment is a basic-layer base station, that is, a base station that is mainly responsible for signaling interaction. To differentiate from a data base station, in the embodiment, a first target data base station is called a first target TeNB, a base station before being switched-out is called a first CeNB, and a base station which is switch-in is called a second CeNB. In the embodiment, the first target TeNB refers to a TeNB covered by the first CeNB.

Step e2: The UE sets up a fifth service bearer on a first target TeNB.

For a specific implementation procedure of step e2, reference may be made to the description of the embodiment shown in FIG. 9A. Specifically, step a2 to step a10 are a specific implementation manner of step e2.

Step e3: The first CeNB receives a second measurement report reported by the UE and selects a second target TeNB for the UE according to the second measurement report.

The second measurement report may be an A3 event, that is, a need to update a CeNB.

Step e4: The first CeNB sends a handover request to a second CeNB.

Step e5: The first CeNB receives a handover request acknowledgement to the second CeNB.

Step e6: The first CeNB sends a bearer switch-out request to the first target TeNB.

Step e7: The first target TeNB sends a bearer switch-out response to the first CeNB.

Step e8: The first target TeNB sends an SN state transfer message to the first CeNB.

Step e9: The first CeNB sends the SN state transfer message to the second CeNB.

Step e10: The first target TeNB transfers unsuccessfully transmitted data to the second CeNB according to an address of a forwarding tunnel.

Step e11: The first CeNB sends a fifth RRC connection reconfiguration message to the UE.

The fifth RRC connection reconfiguration message includes mobility control information.

Step e12: The UE initiates a random access procedure to access the second CeNB.

Step e13: The UE returns a fifth RRC connection reconfiguration completion message to the second CeNB.

Step e14: The second CeNB performs a path switch request procedure with a core network device.

Step e15: The second CeNB sends a UE context deletion message to the first CeNB.

Step e16: The first CeNB sends the UE context deletion message to the first target TeNB.

The foregoing process describes a procedure for handing over a UE from a first CeNB to a second CeNB.

Figure 10:
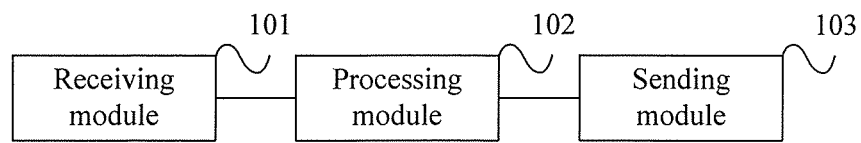
FIG. 10 is a schematic structural diagram of a base station according to still another embodiment of the present invention.

FIG. 10 is a schematic structural diagram of a base station according to still another embodiment of the present invention. As shown in FIG. 10, the base station of the embodiment includes: a receiving module 101, a processing module 102, and a sending module 103.

The receiving module 101 is configured to receive a service bearer request message sent by a basic-layer base station corresponding to the base station of the embodiment. The basic-layer base station is configured to control the base station of the embodiment and a UE to complete processing of a service bearer procedure of the UE.

The processing module 102 is connected to the receiving module 101 and configured to perform processing on the service bearer procedure of the UE according to the service bearer request message received by the receiving module 101.

The sending module 103 is connected to the processing module 102 and configured to: after the processing module 102 completes the processing of the service bearer procedure, return a service bearer response message to the basic-layer base station.

The base station of the embodiment is an enhanced-layer base station (that is, a data base station).

Functional modules of the base station of the embodiment can be configured to execute the process of the first target data base station provided in the foregoing embodiments. Working principles of the functional modules are not described again. For details, refer to the descriptions of the foregoing embodiments.

The base station of the embodiment functions as a data base station and cooperates with the basic-layer base station provided by the embodiments of the present invention, where the basic-layer base station is responsible for signaling interaction of a UE, while the base station of the embodiment is responsible for data transmission of the UE, thereby implementing separation of a signaling plane and a user plane.

Figure 11A:
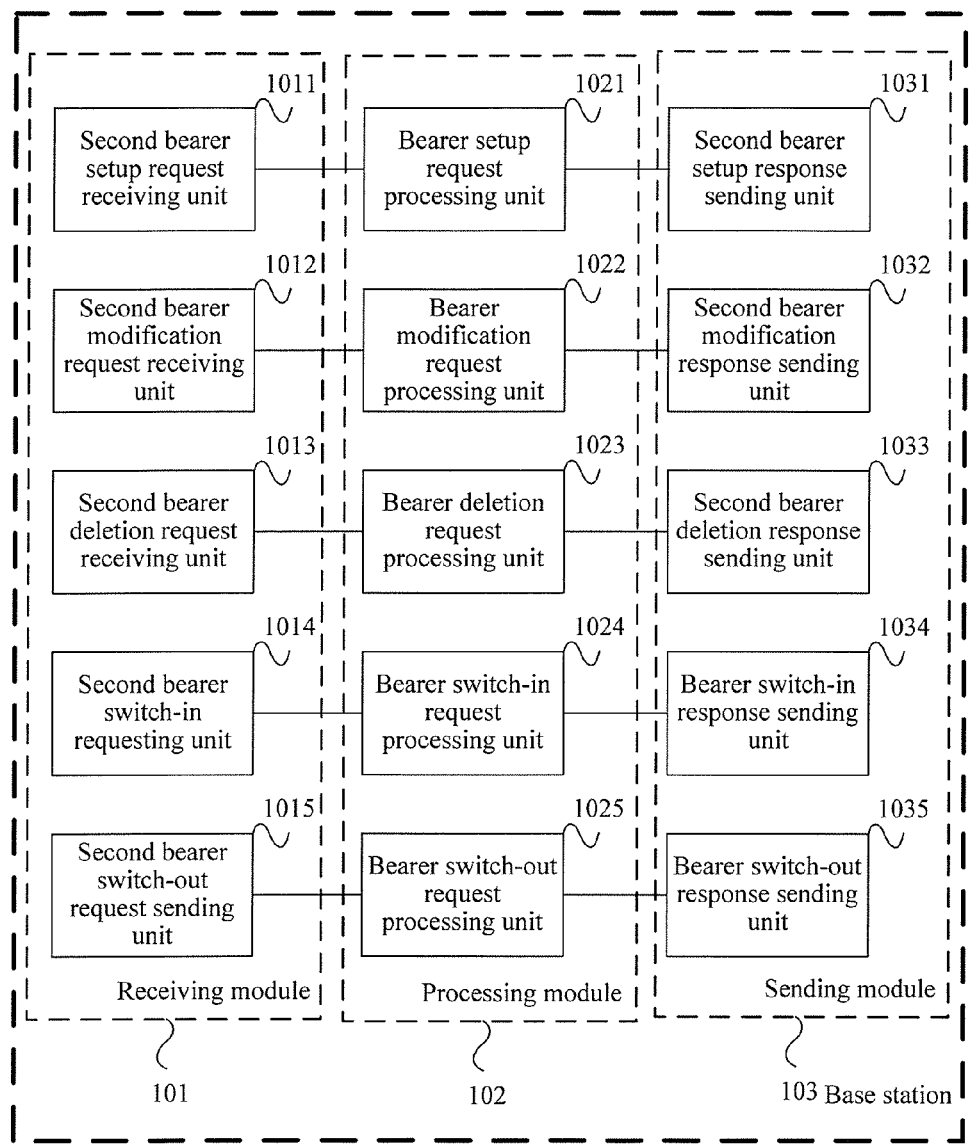
FIG. 11A is a schematic structural diagram of a base station according to still another embodiment of the present invention.

FIG. 11A is a schematic structural diagram of a base station according to still another embodiment of the present invention. The embodiment may be implemented based on the embodiment shown in FIG. 10. As shown in FIG. 11A, the base station of the embodiment also includes: a receiving module 101, a processing module 102, and a sending module 103.

Optionally, the service bearer procedure is a service bearer setup procedure, the service bearer request message is a service bearer setup request message, and the service bearer response message is a service bearer setup response message.

In this case, the receiving module 101 includes: a second bearer setup request receiving unit 1011. The second bearer setup request receiving unit 1011 is configured to receive the service bearer setup request message sent by the basic-layer base station.

The service bearer setup request message includes one piece of the following information: an identifier of the UE, an identifier of a first service bearer, QoS information of the first service bearer, and a DRB adding instruction; an identifier of the UE, an identifier of a first service bearer, QoS information of the first service bearer, a DRB adding instruction, and adding an association relationship between an identifier of an added DRB and an identifier of a carrier or a carrier group on the base station of the embodiment; an identifier of the UE, an identifier of a first service bearer, QoS information of the first service bearer, a DRB adding instruction, and an access network identifier of the UE; and an identifier of the UE, an identifier of a first service bearer, QoS information of the first service bearer, a DRB adding instruction, adding an association relationship between an identifier of an added DRB and an identifier of a carrier or a carrier group on the base station of the embodiment, and an access network identifier of the UE. The first service bearer is a service bearer to be set up.

The processing module 102 includes: a bearer setup request processing unit 1021. The bearer setup request processing unit 1021 is connected to the second bearer setup request receiving unit 1011 and configured to: according to the service bearer setup request message received by the second bearer setup request receiving unit 1011, establish a context of the UE and information of the first service bearer, and perform DRB configuration on the base station for the first service bearer.

The sending module 103 includes: a second bearer setup response sending unit 1031. The second bearer setup response sending unit 1031 is configured to: after the bearer setup request processing unit 1021 completes processing of a setup preparation procedure of the first service bearer, send the service bearer setup response message to the basic-layer base station. Optionally, the second bearer setup response sending unit 1031 is connected to the bearer setup request processing unit 1021.

The service bearer setup response message includes one piece of the following information: information indicating whether the first service bearer is successfully set up; and information indicating whether the first service bearer is successfully set up, and a random access resource for the UE to access the base station.

Optionally, the service bearer procedure is a service bearer modification procedure, the service bearer request message is a service bearer modification request message, and the service bearer response message is a service bearer modification response message.

The receiving module 101 includes: a second bearer modification request receiving unit 1012. The second bearer modification request receiving unit 1012 is configured to receive the service bearer modification request message, which is sent by the basic-layer base station according to a correspondence between a second service bearer and the base station. The service bearer modification request message includes an identifier of the UE, an identifier of the second service bearer, QoS information of the second service bearer, and a DRB modification instruction. The second service bearer is a service bearer to be modified.

The processing module 102 includes: a bearer modification request processing unit 1022. The bearer modification request processing unit 1022 is connected to the second bearer modification request receiving unit 1012 and configured to modify information of the second service bearer and a DRB configuration of the second service bearer on a first target data base station according to the service bearer modification request message received by the second bearer modification request receiving unit 1012.

The sending module 103 includes: a second bearer modification response sending unit 1032. The second bearer modification response sending unit 1032 is configured to: after the bearer modification request processing unit 1022 completes processing of a modification procedure of the second service bearer, send the service bearer modification response message to the basic-layer base station. Optionally, the second bearer modification response sending unit 1032 is connected to the bearer modification request processing unit 1022.

Optionally, the service bearer procedure is a service bearer deletion procedure, the service bearer request message is a service bearer deletion request message, and the service bearer response message is a service bearer deletion response message.

The receiving module 101 includes: a second bearer deletion request receiving unit 1013. The second bearer deletion request receiving unit 1013 is configured to receive the service bearer deletion request message, which is sent by the basic-layer base station according to a correspondence between a third service bearer and the base station, where the service bearer deletion request message includes an identifier of the UE and an identifier of the third service bearer, and the third service bearer is a service bearer to be deleted.

The processing module 102 includes: a bearer deletion request processing unit 1023. The bearer deletion request processing unit 1023 is connected to the second bearer deletion request receiving unit 1013 and configured to perform a deletion procedure of the third service bearer according to the service bearer deletion request message received by the second bearer deletion request receiving unit 1013.

The sending module 103 includes: a second bearer deletion response sending unit 1033. The second bearer deletion response sending unit 1033 is configured to: after the bearer deletion request processing unit 1023 completes processing of the deletion procedure of the third service bearer, send the service bearer deletion response message to the basic-layer base station. Optionally, the second bearer deletion response sending unit 1033 is connected to the bearer deletion request processing unit 1023.

Optionally, the service bearer procedure is a service bearer switch-in procedure, the service bearer request message is a service bearer switch-in request message, and the service bearer response message is a service bearer switch-in response message.

The receiving module 101 includes: a second bearer switch-in requesting unit 1014. The second bearer switch-in requesting unit 1014 is configured to receive the service bearer switch-in request message sent by the basic-layer base station.

The service bearer switch-in request message includes one piece of the following information: an identifier of the UE, an identifier and QoS information of a fourth service bearer, an address of a tunnel for transmitting uplink data of the fourth service bearer, and a DRB adding instruction; an identifier of the UE, an identifier and QoS information of a fourth service bearer, an address of a tunnel for transmitting uplink data of the fourth service bearer, a DRB adding instruction, and an access network identifier of the UE; an identifier of the UE, an identifier and QoS information of a fourth service bearer, an address of a tunnel for transmitting uplink data of the fourth service bearer, a DRB adding instruction, and adding an association relationship between an identifier of an added DRB and an identifier of a carrier or a carrier group on the base station of the embodiment; and an identifier of the UE, an identifier and QoS information of a fourth service bearer, an address of a tunnel for transmitting uplink data of the fourth service bearer, a DRB adding instruction, an access network identifier of the UE, and adding an association relationship between an identifier of the added DRB and an identifier of a carrier or a carrier group on the base station of the embodiment. The fourth service bearer is a service bearer to be switched to the base station.

The processing module 102 includes: a bearer switch-in request processing unit 1024. The bearer switch-in request processing unit 1024 is connected to the second bearer switch-in requesting unit 1014 and configured to: according to the service bearer switch-in request message received by the second bearer switch-in requesting unit 1014, establish a context of the UE and information of the fourth service bearer, establish a tunnel for forwarding the fourth service bearer, and perform DRB configuration on the base station for the fourth service bearer.

The sending module 103 includes: a bearer switch-in response sending unit 1034. The bearer switch-in response sending unit 1034 is configured to: after the bearer switch-in request processing unit 1024 completes processing of a switch-in preparation procedure of the fourth service bearer, send the service bearer switch-in response message to the basic-layer base station. Optionally, the bearer switch-in response sending unit 1034 is connected to the bearer switch-in request processing unit 1024.

The service bearer switch-in response message includes one piece of the following information: an address of a tunnel for transmitting downlink data of the fourth service bearer; an address of a tunnel for transmitting downlink data of the fourth service bearer and a random access resource for the UE to access a first target data base station; an address of a tunnel for transmitting downlink data of the fourth service bearer and an address of a tunnel used for forwarding an unsuccessfully transmitted uplink and/or downlink data packet of the fourth service bearer; and an address of a tunnel for transmitting downlink data of the fourth service bearer, a random access resource for the UE to access a first target data base station, and an address of a tunnel used for forwarding an unsuccessfully transmitted uplink and/or downlink data packet of the fourth service bearer.

Optionally, the service bearer procedure is a service bearer switch-out procedure, the service bearer request message is a service bearer switch-out request message, and the service bearer response message is a service bearer switch-out response message.

The receiving module 101 includes: a second bearer switch-out request sending unit 1015. The second bearer switch-out request sending unit 1015 is configured to receive the service bearer switch-out request message sent by the basic-layer base station. The service bearer switch-out request message includes one piece of the following information: an identifier of the UE and an identifier of a fifth service bearer; and an identifier of the UE, an identifier of a fifth service bearer, and an address of a tunnel used for forwarding an unsuccessfully transmitted uplink and/or downlink data packet of the fifth service bearer, where the fifth service bearer is a service bearer to be switched out of the base station.

The processing module 102 includes: a bearer switch-out request processing unit 1025. The bearer switch-out request processing unit 1025 is connected to the second bearer switch-out request sending unit 1015 and configured to: according to the service bearer switch-out request message received by the second bearer switch-out request sending unit 1015, stop data transmission of the fifth service bearer, establish a tunnel for forwarding the fifth service bearer, and forward unsuccessfully transmitted data in the tunnel.

The sending module 103 includes: a bearer switch-out response sending unit 1035. The bearer switch-out response sending unit 1035 is configured to: after the bearer switch-out request sending unit 1025 completes processing of a switch-out procedure of the fifth service bearer, send the service bearer switch-out response message to the basic-layer base station. Optionally, the bearer switch-out response sending unit 1035 is connected to the bearer switch-out request sending unit 1025.

Further, the base station of the embodiment may further include: a reporting module 104. The reporting module 104 is configured to: when an uplink signal meeting a preset condition is received, report an event report to the basic-layer base station, so that the basic-layer base station stores a correspondence between an identifier of the base station and the identifier of the UE according to the event report, generates a candidate data base station list, and maintains the candidate data base station list.

It is noted herein that the foregoing basic-layer base station may be the base station provided by the embodiments shown in FIGS. 1B to 6.

Functional modules or units in the embodiment can be configured to execute the corresponding process of the target data base station in the foregoing six embodiments. Working principles of the functional modules or units are not described again. For details, refer to the descriptions of the foregoing embodiments.

The base station of the embodiment functions as a data base station and cooperates with the basic-layer base station provided by the embodiments of the present invention, where the basic-layer base station is responsible for signaling interaction of a UE, while the base station of the embodiment is responsible for data transmission of the UE, thereby implementing separation of a signaling plane and a user plane.

It is noted herein that the base station of the embodiment does not have any RRC function except providing, according to a configuration of a basic-layer base station, data transmission for a service bearer of a UE.

Figure 11B:
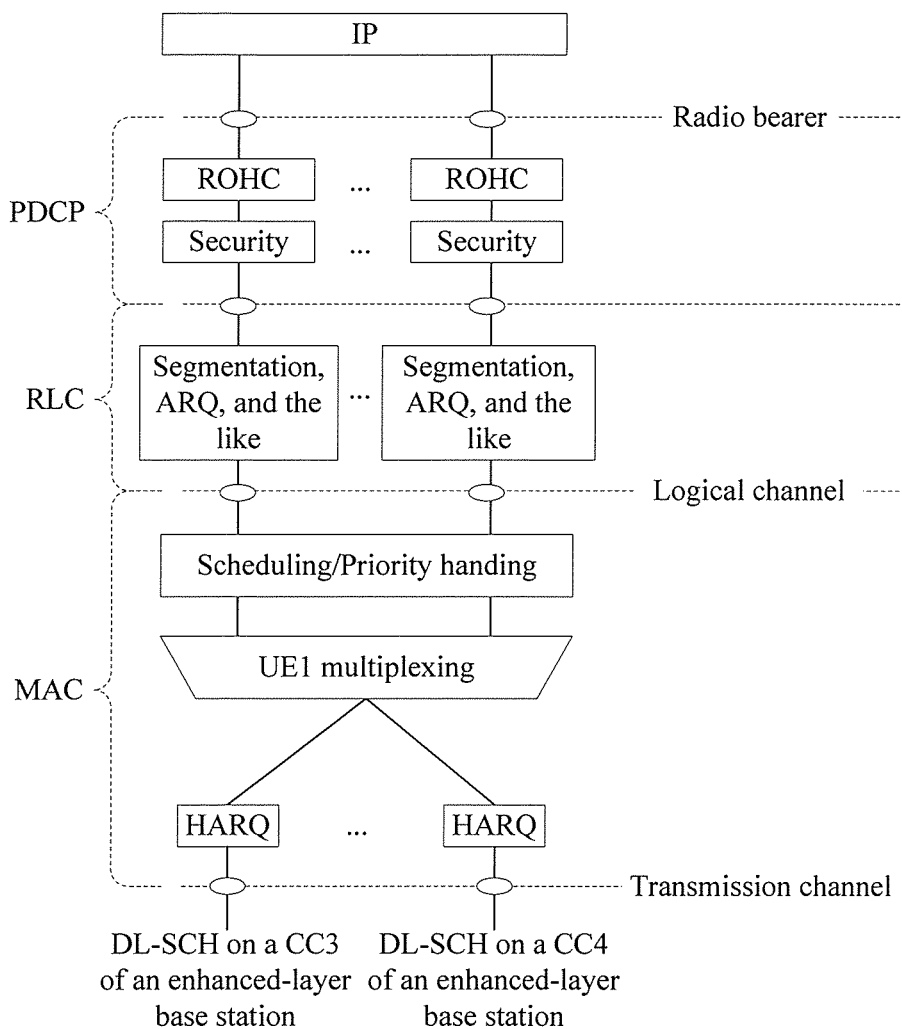
FIG. 11B is a schematic diagram of a protocol stack structure of a base station when downlink mapping is performed according to still another embodiment of the present invention.

In an LTE system that is used an example, a protocol stack of the base station of the embodiment includes a PDCP layer, an RLC layer, a MAC layer, and a physical layer from top to bottom. FIG. 11B shows a structure of a protocol stack of the base station of the embodiment when downlink mapping is performed. On the base station of the embodiment, only an air interface user plane function of a UE is provided and no control plane function is provided.

Figure 12:
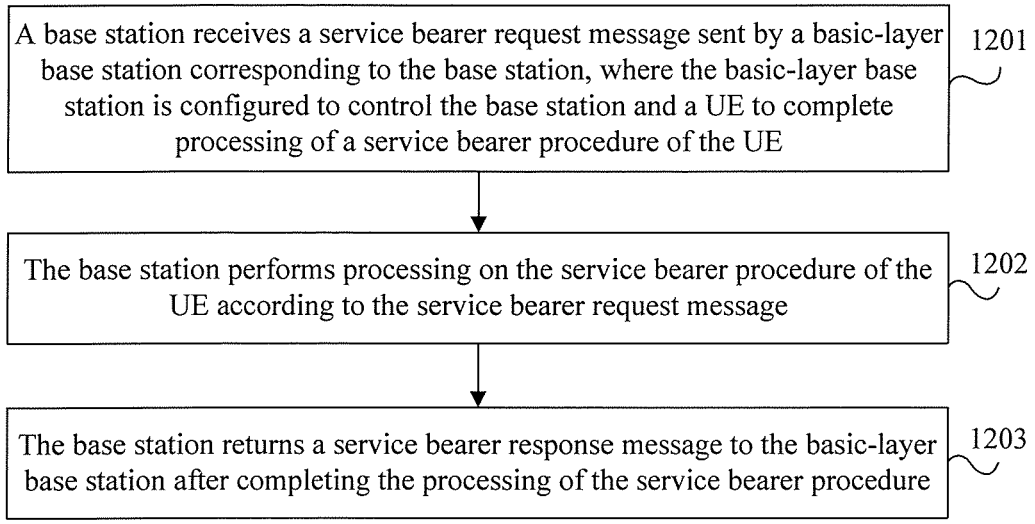
FIG. 12 is a flowchart of a communications method according to still another embodiment of the present invention.

FIG. 12 is a flowchart of a communications method according to still another embodiment of the present invention. As shown in FIG. 12, the method of the embodiment includes:

Step 1201: A base station receives a service bearer request message sent by a basic-layer base station corresponding to the base station, where the basic-layer base station is configured to control the base station and a UE to complete processing of a service bearer procedure of the UE.

Step 1202: The base station performs processing on the service bearer procedure of the UE according to the service bearer request message.

Step 1203: The base station returns a service bearer response message to the basic-layer base station after completing the processing of the service bearer procedure.

The base station of the embodiment is a data base station, and more specifically, a target data base station selected by the basic-layer base station.

In the embodiment, the base station of the embodiment functions as a data base station and cooperates with the basic-layer base station provided by the embodiments of the present invention, where the basic-layer base station is responsible for signaling interaction of a UE, while the base station of the embodiment is responsible for data transmission of the UE, thereby implementing separation of a signaling plane and a user plane.

Optionally, the service bearer procedure is a service bearer setup procedure, the service bearer request message is a service bearer setup request message, and the service bearer response message is a service bearer setup response message. In this case, an implementation manner of step 1201 includes: receiving, by the base station, the service bearer setup request message sent by the basic-layer base station.

The service bearer setup request message includes one piece of the following information: an identifier of the UE, an identifier of a first service bearer, QoS information of the first service bearer, and a DRB adding instruction; an identifier of the UE, an identifier of a first service bearer, QoS information of the first service bearer, a DRB adding instruction, and adding an association relationship between an identifier of an added DRB and an identifier of a carrier or a carrier group on the base station of the embodiment; an identifier of the UE, an identifier of a first service bearer, QoS information of the first service bearer, a DRB adding instruction, and an access network identifier of the UE; and an identifier of the UE, an identifier of a first service bearer, QoS information of the first service bearer, a DRB adding instruction, an access network identifier of the UE, and adding an association relationship between an identifier of an added DRB and an identifier of a carrier or a carrier group on the base station of the embodiment. The first service bearer is a service bearer to be set up.

An implementation manner of step 1202 includes: establishing, by the base station according to the service bearer setup request message, a context of the UE and information of the first service bearer, and performing DRB configuration on the base station for the first service bearer.

An implementation manner of step 1203 includes: sending, by the base station, the service bearer setup response message to the basic-layer base station after completing processing of a setup preparation procedure of the first service bearer. The service bearer setup response message includes one piece of the following information: information indicating whether the first service bearer is successfully set up; and information indicating whether the first service bearer is successfully set up, and a random access resource for the UE to access the base station.

Optionally, the service bearer procedure is a service bearer modification procedure, the service bearer request message is a service bearer modification request message, and the service bearer response message is a service bearer modification response message.

In this case, an implementation manner of step 1201 includes: receiving, by the base station, the service bearer modification request message, which is sent by the basic-layer base station according to a correspondence between a second service bearer and the base station. The service bearer modification request message includes an identifier of the UE, an identifier of the second service bearer, QoS information of the second service bearer, and a DRB modification instruction. The second service bearer is a service bearer to be modified.

An implementation manner of step 1202 includes: modifying, by the base station, information of the second service bearer and a DRB configuration of the second service bearer on a first target data base station according to the service bearer modification request message.

An implementation manner of step 1203 includes: sending, by the base station, the service bearer modification response message to the basic-layer base station after completing processing of a modification preparation procedure of the second service bearer.

Optionally, the service bearer procedure is a service bearer deletion procedure, the service bearer request message is a service bearer deletion request message, and the service bearer response message is a service bearer deletion response message.

In this case, an implementation manner of step 1201 includes: receiving, by the base station, the service bearer deletion request message, which is sent by the basic-layer base station according to a correspondence between a third service bearer and the base station. The service bearer deletion request message includes an identifier of the UE and an identifier of the third service bearer, and the third service bearer is a service bearer to be deleted.

An implementation manner of step 1202 includes: performing, by the base station, a deletion procedure of the third service bearer according to the service bearer deletion request message.

An implementation manner of step 1203 includes: sending, by the base station, the service bearer deletion response message to the basic-layer base station after completing processing of the deletion procedure of the third service bearer.

Optionally, the service bearer procedure is a service bearer switch-in procedure, the service bearer request message is a service bearer switch-in request message, and the service bearer response message is a service bearer switch-in response message.

An implementation manner of step 1201 includes: receiving, by the base station, the service bearer switch-in request message sent by the basic-layer base station.

The service bearer switch-in request message includes one piece of the following information: an identifier of the UE, an identifier and QoS information of a fourth service bearer, an address of a tunnel for transmitting uplink data of the fourth service bearer, and a DRB adding instruction; an identifier of the UE, an identifier and QoS information of a fourth service bearer, an address of a tunnel for transmitting uplink data of the fourth service bearer, a DRB adding instruction, and an access network identifier of the UE; an identifier of the UE, an identifier and QoS information of a fourth service bearer, an address of a tunnel for transmitting uplink data of the fourth service bearer, a DRB adding instruction, and adding an association relationship between an identifier of an added DRB and an identifier of a carrier or a carrier group on the base station of the embodiment; and an identifier of the UE, an identifier and QoS information of a fourth service bearer, an address of a tunnel for transmitting uplink data of the fourth service bearer, a DRB adding instruction, an access network identifier of the UE, and adding an association relationship between an identifier of an added DRB and an identifier of a carrier or a carrier group on the base station of the embodiment. The fourth service bearer is a service bearer to be switched to the base station.

An implementation manner of step 1202 includes: according to the service bearer transfer-in request message, establishing, by the base station, a context of the UE and information of the fourth service bearer, establishing a tunnel for forwarding the fourth service bearer, and performing DRB configuration on the base station for the fourth service bearer.

An implementation manner of step 1203 includes: sending, by the base station, the service bearer switch-in response message to the basic-layer base station after completing processing of a switch-in preparation procedure of the fourth service bearer.

The service bearer switch-in response message includes one piece of the following information: an address of a tunnel for transmitting downlink data of the fourth service bearer; an address of a tunnel for transmitting downlink data of the fourth service bearer and a random access resource for the UE to access a first target data base station; an address of a tunnel for transmitting downlink data of the fourth service bearer and an address of a tunnel used for forwarding an unsuccessfully transmitted uplink and/or downlink data packet of the fourth service bearer; and an address of a tunnel for transmitting downlink data of the fourth service bearer, a random access resource for the UE to access a first target data base station, and an address of a tunnel used for forwarding an unsuccessfully transmitted uplink and/or downlink data packet of the fourth service bearer.

Optionally, the service bearer procedure is a service bearer switch-out procedure, the service bearer request message is a service bearer switch-out request message, and the service bearer response message is a service bearer switch-out response message.

An implementation manner of step 1201 includes: receiving, by the base station, the service bearer switch-out request message sent by the basic-layer base station, where the service bearer switch-out request message includes one piece of the following information: an identifier of the UE and an identifier of a fifth service bearer; and an identifier of the UE, an identifier of a fifth service bearer, and an address of a tunnel used for forwarding an unsuccessfully transmitted uplink and/or downlink data packet of the fifth service bearer, where the fifth service bearer is a service bearer to be switched out of the base station.

An implementation manner of step 1202 includes: according to the service bearer switch-out request message, stopping, by the base station, data transmission of the fifth service bearer, establishing a tunnel for forwarding the fifth service bearer, and forwarding unsuccessfully transmitted data in the tunnel.

An implementation manner of step 1203 includes: sending, by the base station, the service bearer switch-out response message to the basic-layer base station after completing processing of a switch-out procedure of the fifth service bearer.

Further, the communications method of the embodiment may further include: reporting, by the base station when an uplink signal meeting a preset condition is received, an event report to the basic-layer base station, so that the basic-layer base station stores a correspondence between an identifier of the base station and the identifier of the UE to a candidate data base station list according to the event report and maintains the candidate data base station list.

It can be seen from the above that the base station of the embodiment functions as a data base station and cooperates with the basic-layer base station provided by the embodiments of the present invention, where the basic-layer base station is responsible for signaling interaction of a UE, while the base station of the embodiment is responsible for data transmission of the UE, to complete service bearer procedures such as setup, modification, deletion, switch-in, and switch-out, thereby implementing separation of a signaling plane and a user plane.

Figure 13A:
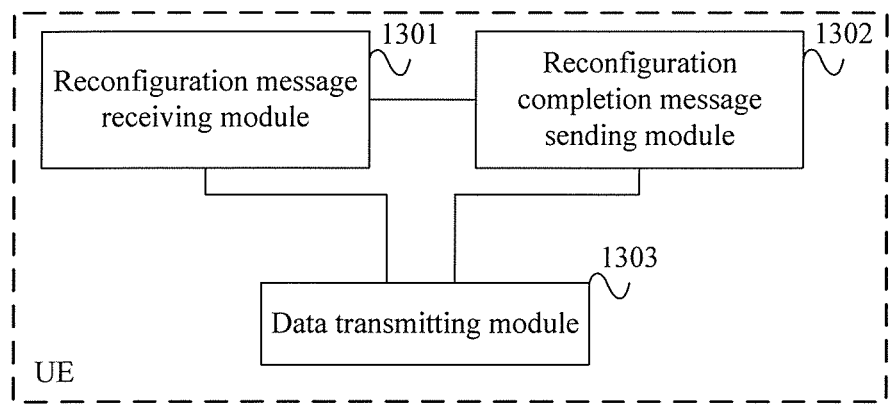
FIG. 13A is a schematic structural diagram of a UE according to an embodiment of the present invention.

FIG. 13A is a schematic structural diagram of a UE according to an embodiment of the present invention. As shown in FIG. 13A, the UE of the embodiment includes: a reconfiguration message receiving module 1301, a reconfiguration completion message sending module 1302, and a data transmitting module 1303.

The reconfiguration message receiving module 1301 is configured to receive an RRC connection reconfiguration message sent by a base station, and maintain an association relationship between an identifier of a DRB of a service bearer of the UE and an identifier of a carrier or a carrier group according to the RRC connection reconfiguration message, where the RRC connection reconfiguration message includes: adding, deleting, or modifying the association relationship between an identifier of a DRB of a service bearer of the UE and an identifier of a carrier or a carrier group.

It is noted herein that the base station of the embodiment is a basic-layer base station.

The reconfiguration completion message sending module 1302 is configured to perform processing of a service bearer procedure according to the RRC connection reconfiguration message and send, after completing the processing of the service bearer procedure, an RRC connection reconfiguration completion message to the base station.

The data transmitting module 1303 is connected to the reconfiguration message receiving module 1301 and configured to: according to the maintained association relationship between an identifier of a DRB of a service bearer of the UE and an identifier of a carrier or a carrier group, perform data transmission of the DRB on an associated carrier or carrier group.

Optionally, the reconfiguration message receiving module 1301 is further connected to the reconfiguration completion message sending module 1302, and the reconfiguration completion message sending module 1302 is connected to the data transmitting module 1303.

In the embodiment, if an associated carrier or carrier group is configured for a DRB, data of the DRB must be sent on the associated carrier or carrier group. The associated carrier or carrier group may be a carrier or a carrier group on a basic-layer base station, and may also be a carrier or a carrier group on an enhanced-layer base station.

In the embodiment, if no associated carrier or carrier group is configured for a DRB, data of the DRB can be transmitted on any component carrier of the UE.

Functional modules of the UE of the embodiment can be configured to execute the operation process of the UE in the foregoing embodiments. Working principles of the functional modules are not described again. For details, refer to the descriptions of the foregoing embodiments.

The UE of the embodiment cooperates with the basic-layer base station and the data base station provided by the embodiments of the present invention, where the basic-layer base station controls signaling interaction of the UE and the data base station is responsible for data transmission of the UE, thereby implementing separation of a signaling plane and a user plane.

Figure 13B:
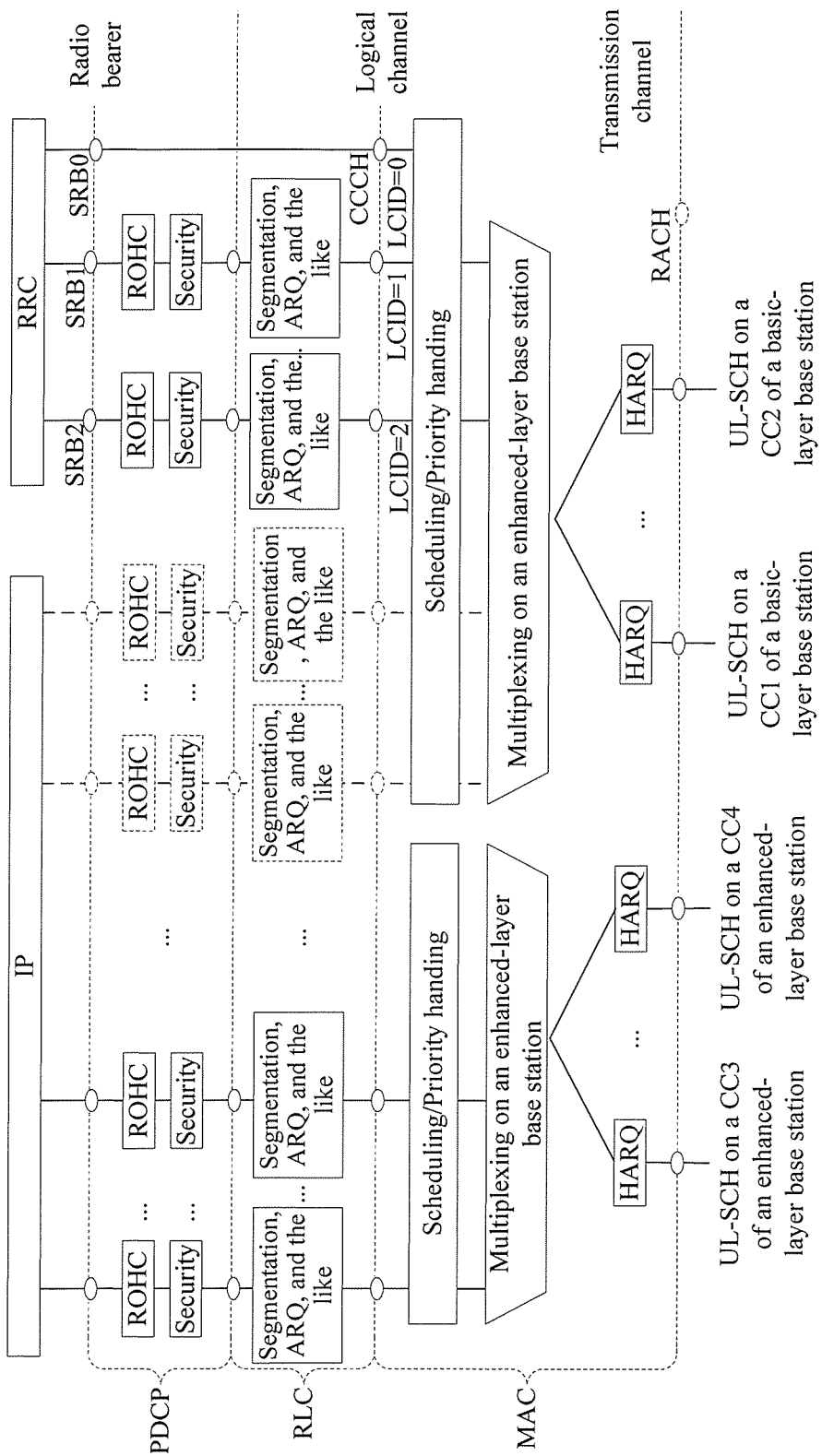
FIG. 13B is a schematic diagram of a protocol stack structure of a UE when uplink mapping is performed according to an embodiment of the present invention.

In an LTE system that is used as an example, a protocol stack of the UE of the embodiment includes an RRC layer/IP layer, a PDCP layer, an RLC layer, a MAC layer, and a physical layer from top to bottom. FIG. 13B shows a structure of a protocol stack of the UE of the embodiment when uplink mapping is performed, where a part indicated by a dashed box is used to take charge of DRB transmission and this part is optional. On the UE of the embodiment, SRB0/1/2 of the UE are all mapped to a carrier or a carrier group of a basic-layer base station for transmission, while a DRB of the UE is mapped to a carrier or a carrier group of a basic-layer data base station or a data base station according to an association relationship with a carrier or a carrier group for transmission.

Figure 14:
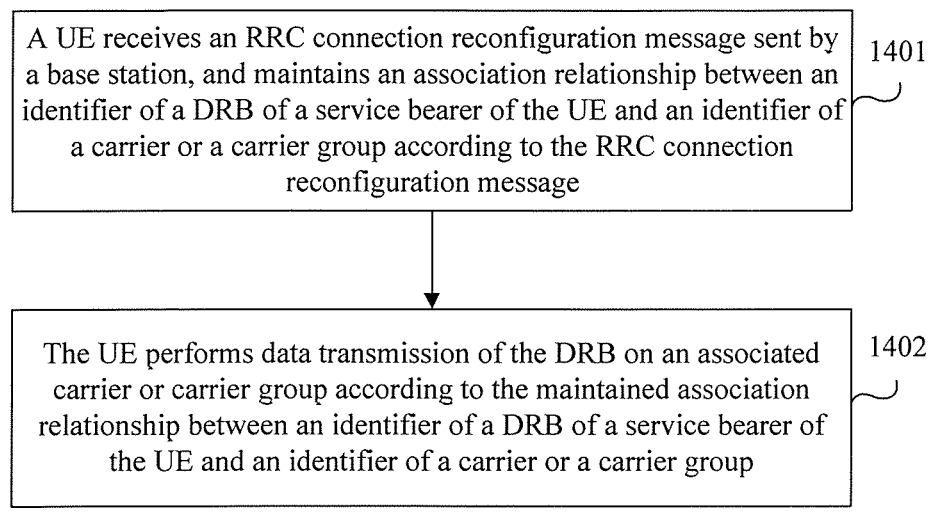
FIG. 14 is a flowchart of a communications method according to still another embodiment of the present invention.

FIG. 14 is a flowchart of a communications method according to still another embodiment of the present invention. As shown in FIG. 14, the method of the embodiment includes:

Step 1401: A UE receives an RRC connection reconfiguration message sent by a base station, and maintains an association relationship between an identifier of a DRB of a service bearer of the UE and an identifier of a carrier or a carrier group according to the RRC connection reconfiguration message.

The RRC connection reconfiguration message includes: adding, deleting, or modifying the association relationship between an identifier of a DRB of a service bearer of the UE and an identifier of a carrier or a carrier group.

Step 1402: The UE performs data transmission of the DRB on an associated carrier or carrier group according to the maintained association relationship between an identifier of a DRB of a service bearer of the UE and an identifier of a carrier or a carrier group.

Optionally, the method of the embodiment further includes: performing, by the UE, processing of a service bearer procedure according to the RRC connection reconfiguration message and sending, after completing the processing of the service bearer procedure, an RRC connection reconfiguration completion message to the base station.

In the embodiment, the UE of the embodiment cooperates with the basic-layer base station and the data base station provided by the embodiments of the present invention, where the basic-layer base station controls signaling interaction of the UE and the data base station is responsible for data transmission of the UE, thereby implementing separation of a signaling plane and a user plane.

Based on the above, an embodiment of the present invention provides a communications system, including a basic-layer base station and an enhanced-layer base station. The basic-layer base station may be the base station provided by the embodiments shown in FIG. 1B to FIG. 6. For a specific working principle of the basic-layer base station, reference may be made to the descriptions of the embodiments shown in FIG. 1B to FIG. 6 and FIG. 8 to FIG. 9E, and details are not described herein again. The enhanced-layer base station may be the base station provided by the embodiment shown in FIG. 10 or FIG. 11A. For a specific working principle of the enhanced-layer base station, reference may be made to the descriptions of the embodiments shown in FIG. 10, FIG. 11A, and FIG. 12, and details are not described herein again.

Further, the communications system provided by the embodiment may further include a UE. The UE of the embodiment may be the UE provided by the embodiment shown in FIG. 13A. For a specific working principle of the UE, reference may be made to the descriptions of the embodiments shown in FIG. 13A and FIG. 14, and details are not described herein again.

It is noted herein that, in addition to having the functions described in the embodiments shown in FIG. 13A and FIG. 14, the UE of the embodiment may further have the functions of the UE involved in other embodiments of the present invention, and details are not described herein again.

Figure 15A:
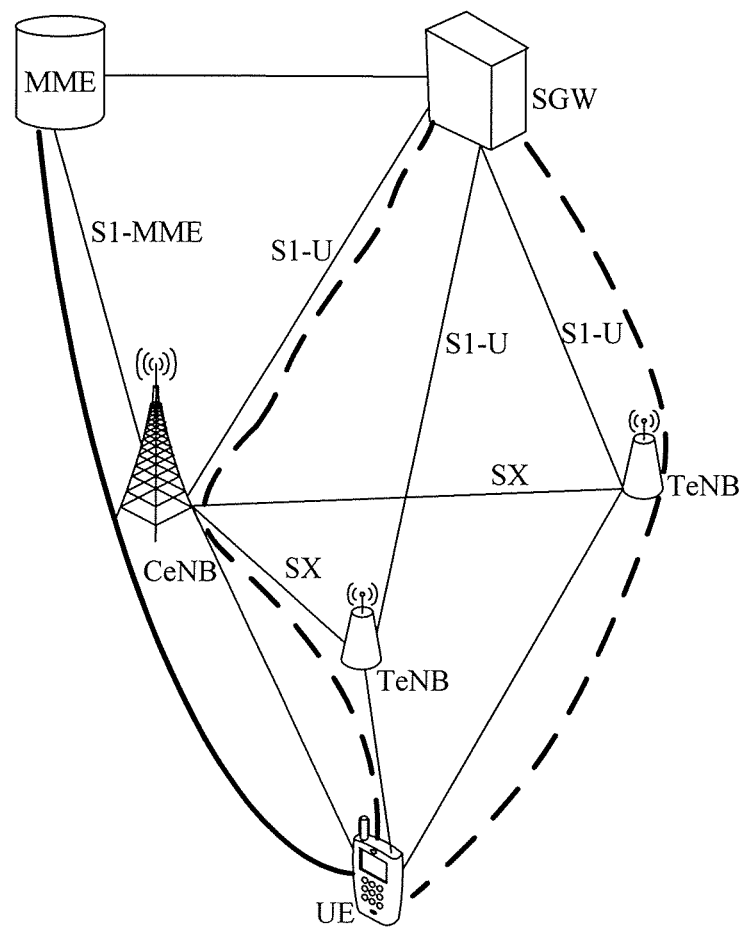
FIG. 15A is a schematic diagram of a network architecture according to an embodiment of the present invention.

The following describes an application of the communications system of the embodiment by using an example. FIG. 15A shows a network architecture of the communications system provided by the embodiment is applied. In the architecture shown in FIG. 15A, a serving gateway (Serving Gateway, SGW), an MME, a TeNB (that is, an enhanced-layer base station), a CeNB (that is, a basic-layer base station), and a UE are included. The MME is connected to the SGW. The CeNB is separately connected to the UE, the TeNB, the MME, and the SGW. The TeNB is further connected to the UE and the SGW. As shown in FIG. 15A, in the embodiment, an interface between a TeNB and a CeNB is marked as an SX interface, an interface between a TeNB and an SGW and an interface between a CeNB and an SGW are marked as S1-U, and an interface between a CeNB and an MME is marked as S1-MME, but no limitation is posed thereon. In the architecture shown in FIG. 15A, a UE may be served by a CeNB and a TeNB at the same time, thereby implementing separation of a user plane and a control plane of a UE. As shown in FIG. 15A, a bold dashed line indicates a data connection of a UE and a bold sold line indicates a signaling connection of a UE. FIG. 15A shows that a UE is served by two TeNBs, but not limited to the two TeNBs. A TeNB serving the UE is determined by a CeNB.

Figure 15B:
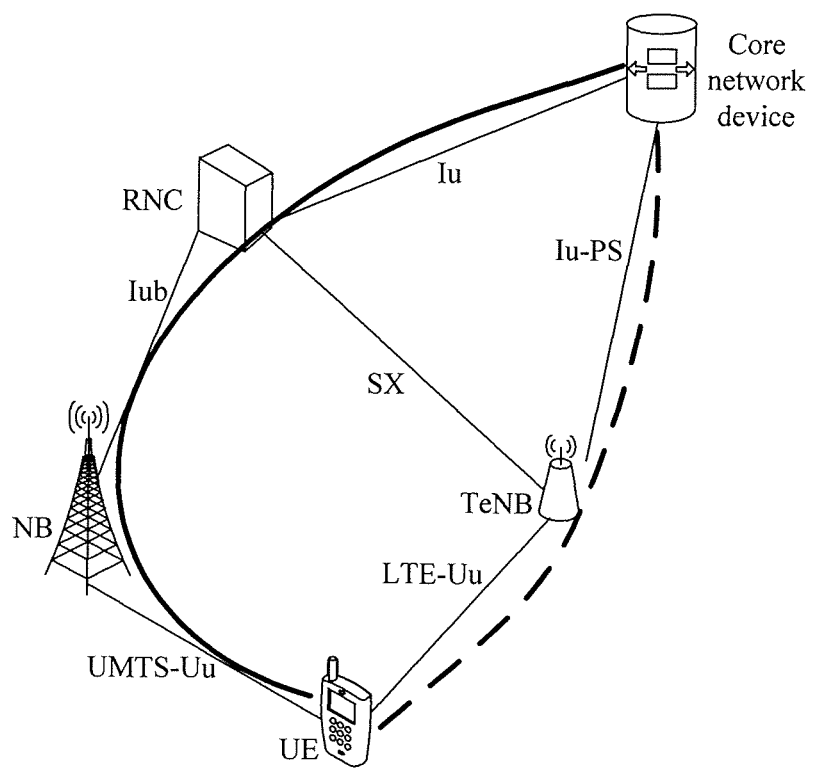
FIG. 15B is a schematic diagram of another network architecture according to an embodiment of the present invention.

FIG. 15B shows another network architecture of the communications system provided by the embodiment is applied. In the architecture shown in FIG. 15B, a core network device, a radio network controller (Radio Network Controller, RNC), a base station (NodeB, NB), a TeNB (that is, an enhanced-layer base station), and a UE are included. The RNC is separately connected to the core network device, the TeNB, and the NB. The TeNB is further connected to the UE and the core network device. The UE is further connected to the NB. As shown in FIG. 15B, in the embodiment, an interface between an RNC and a core network device is marked as u, an interface between an RNC and an NB is marked as Iub, an interface between an RNC and a TeNB is marked as SX, an interface between a TeNB and a core network device is marked as Iu-PS, an interface between a TeNB and a UE is marked as LTE-Uu, and an interface between an NB and a UE is marked as UMTS-Uu, but no limitation is posed thereon. In the architecture shown in FIG. 15B, an RNC and an NB jointly function as a CeNB. A CeNB adopts a Universal Mobile Telecommunications System (Universal Mobile Telecommunications System, UMTS) technology to serve a UE, and a TeNB adopts an LTE technology to serve a UE. In the architecture shown in FIG. 15B, a UE may be served by a CeNB and a TeNB together at the same time, thereby implementing separation of a user plane and a control plane of a UE. As shown in FIG. 15B, a bold dashed line indicates a data connection of a UE and a bold sold line indicates a signaling connection of a UE.

In the communications system provided by the embodiment, a basic-layer base station cooperates with an enhanced-layer base station, where the basic-layer base station controls signaling interaction of a UE and the enhanced-layer base station is responsible for data transmission of a UE, thereby implementing separation of a signaling plane and a user plane and solving an access problem of the UE.

It is noted herein that the foregoing embodiments of the present invention provide description by using an LTE system as an example, but no limitation is posed thereon. The technical solutions provided by the embodiments of the present invention are applicable to a scenario in which a user plane and a control plane need to be separated, for example, may also to a WiFi network.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A base station, comprising:
at least one processor and a memory coupled to the at least one processor; wherein the processor is configured to
maintain a correspondence between a service bearer of a user equipment (UE) accessing the base station and a first target data base station,
acquire an identifier of the first target data base station, to send a service bearer request message to the first target data base station according to the identifier of the first target data base station, so as to control the first target data base station to perform the processing of the service bearer procedure of the UE,
receive a service bearer response message that the first target data base station returns after completing the processing of the service bearer procedure,
send a radio resource control (RRC) connection reconfiguration message to the UE, so as to control the UE to perform corresponding configuration for the service bearer procedure to complete the processing of the service bearer procedure; and
wherein the first target data base station is a base station that exchanges user plane data with the UE after completing the processing of the service bearer procedure of the UE, and the base station is responsible for signaling transmission of a signaling plane.

2. The base station according to claim 1, wherein:
the service bearer procedure is a service bearer setup procedure, the service bearer request message is a service bearer setup request message, and the service bearer response message is a service bearer setup response message;
the processor is further configured to:
receive the service bearer setup request message sent by a core network device, wherein the service bearer setup request message comprises an identifier of the UE, an identifier of a first service bearer, and quality of service (QoS) information of the first service bearer, and the first service bearer is a service bearer to be set up,
acquire the identifier of the first target data base station, and send the service bearer setup request message comprising first information to the first target data base station according to the identifier of the first target data base station, so that the first target data base station establishes a context of the UE and information of the first service bearer, and performs data radio bearer (DRB) configuration on the first target data base station for the first service bearer,
receive the service bearer setup response message, which is sent by the first target data base station after processing of a setup preparation procedure of the first service bearer is complete,
after receiving the service bearer setup response message, send a response message indicating whether the service bearer is successfully set up to the core network device, and
select the first target data base station from a candidate data base station list of the UE for the first service bearer.

3. The base station according to claim 2, wherein:
the processor is further configured to:
send a first RRC connection reconfiguration message to the UE, so as to control the UE to perform DRB configuration for setting up the first service bearer on the first target data base station, wherein the first RRC connection reconfiguration message comprises the DRB adding instruction and the adding an association relationship between an identifier of the DRB and an identifier of a carrier or a carrier group on the first target data base station,
receive a first RRC connection reconfiguration completion message, which is sent by the UE after processing of a setup procedure of the first service bearer is complete, and
record a correspondence between the first service bearer and the first target data base station.

4. The base station according to claim 1, wherein:
the service bearer procedure is a service bearer modification procedure, the service bearer request message is a service bearer modification request message, and the service bearer response message is a service bearer modification response message; and
the processor is further configured to:
receive the service bearer modification request message sent by a core network device, wherein the service bearer modification request message comprises an identifier of the UE, an identifier of a second service bearer, and quality of service (QoS) information of the second service bearer, and the second service bearer is a service bearer to be modified, acquire the identifier of the first target data base station, send the service bearer modification request message comprising a DRB modification instruction to the first target data base station according to the identifier of the first target data base station, so that the first target data base station modifies information of the second service bearer and a DRB configuration of the second service bearer on the first target data base station, receive the service bearer modification response message, which is sent by the first target data base station after processing of a modification procedure of the second service bearer is complete, and after receiving the service bearer modification response message, send a response message indicating whether the service bearer is successfully modified to the core network device.

5. The base station according to claim 4, wherein the processor is further configured to:

send a second RRC connection reconfiguration message to the UE, so that the UE modifies the DRB configuration of the second service bearer, wherein the second RRC connection reconfiguration message comprises the DRB modification instruction, and receive a second RRC connection reconfiguration completion message, which is sent by the UE after the processing of the modification procedure of the second service bearer is complete.

6. The base station according to claim 1, wherein:

the service bearer procedure is a service bearer deletion procedure, the service bearer request message is a service bearer deletion request message, and the service bearer response message is a service bearer deletion response message; and the processor is further configured to:

receive the service bearer deletion request message sent by a core network device, wherein the service bearer deletion request message comprises an identifier of the UE and an identifier of a third service bearer, and the third service bearer is a service bearer to be deleted, acquire the identifier of the first target data base station, and forward the service bearer deletion request message to the first target data base station according to the identifier of the first target data base station, so that the first target data base station performs a deletion procedure of the third service bearer, receive the service bearer deletion response message sent by the first target data base station, and after receiving the service bearer deletion response message, send a response message indicating whether the service bearer is successfully deleted to the core network device.

7. The base station according to claim 6, wherein:

the processor is further configured to:

send a third RRC connection reconfiguration message to the UE, so as to control the UE to delete a DRB configuration of the third service bearer, wherein the third RRC connection reconfiguration message comprises a DRB deletion instruction, and receive a third RRC connection reconfiguration completion message, which is sent by the UE after processing of the deletion procedure of the third service bearer is complete, and delete a correspondence between the third service bearer and the first target data base station.

8. The base station according to claim 1, wherein:

the processor is further configured to:

receive an event report reported by a data base station that receives an uplink signal meeting a preset condition and is within a coverage scope of the base station, store a correspondence between an identifier of the data base station reporting the event report and the identifier of the UE to the candidate data base station list, and maintain the candidate data base station list; or receive a measurement result, which is reported by the UE, of a data base station meeting a measurement criterion configured by the base station, store a correspondence between an identifier of the data base station in the measurement result and the identifier of the UE to the candidate data base station list, and maintain the candidate data base station list.

9. A communications method, comprising:

maintaining, by a base station, a correspondence between a service bearer of a user equipment (UE) accessing the base station and a first target data base station;

acquiring, by the base station, an identifier of the first target data base station, and sending a service bearer request message to the first target data base station according to the identifier of the first target data base station, so as to control the first target data base station to perform the processing of the service bearer procedure of the UE;

receiving, by the base station, a service bearer response message that the first target data base station returns after completing the processing of the service bearer procedure; and sending, by the base station, a radio resource control (RRC) connection reconfiguration message to the UE, so as to control the UE to perform corresponding configuration for the service bearer procedure to complete the processing of the service bearer procedure; and wherein the first target data base station is a base station that exchanges user plane data with the UE after completing the processing of the service bearer procedure of the UE, and the base station is responsible for signaling transmission of a signaling plane.

10. The communications method according to claim 9, wherein:

the service bearer procedure is a service bearer setup procedure, the service bearer request message is a service bearer setup request message, and the service bearer response message is the service bearer setup response message;

acquiring, by the base station, an identifier of the first target data base station, and sending a service bearer request message to the first target data base station according to the identifier of the first target data base station, so as to control the first target data base station to perform the processing of the service bearer procedure of the UE comprises:

receiving, by the base station, the service bearer setup request message sent by a core network device, wherein the service bearer setup request message comprises an identifier of the UE, an identifier of a first service bearer, and quality of service (QoS) information of the first service bearer, and the first service bearer is a service bearer to be set up, selecting, by the base station, the first target data base station from a candidate data base station list of the UE for the first service bearer, and sending, by the base station, the service bearer setup request message comprising first information to the first target data base station according to the identifier of the first target data base station, so that the first target data base station establishes a context of the UE and information of the first service bearer, and performs data radio bearer (DRB) configuration on the first target data base station for the first service bearer, wherein the first information comprises one piece of the following information: a DRB adding instruction; the DRB adding instruction and adding an association relationship between an identifier of the DRB and an identifier of a carrier or a carrier group on the first target data base station; the DRB adding instruction and an access network identifier of the UE; and the DRB adding instruction, adding an association relationship between an identifier of the DRB and an identifier of a carrier or a carrier group on the first target data base station, and an access network identifier of the UE; and receiving, by the base station, a service bearer response message that the first target data base station returns after completing the processing of the service bearer procedure comprises:

receiving, by the base station, the service bearer setup response message, which is sent by the first target data base station after processing of a setup preparation procedure of the first service bearer is complete, wherein the service bearer setup response message comprises one piece of the following information: information indicating whether the first service bearer is successfully set up; and information indicating whether the first service bearer is successfully set up, and a random access resource for the UE to access the first target data base station, and sending, by the base station after receiving the service bearer setup response message, a response message indicating whether the service bearer is successfully set up to the core network device.

11. The communications method according to claim 10, wherein:

sending, by the base station, an RRC connection reconfiguration message to the UE, so as to control the UE to perform corresponding configuration for the service bearer procedure to complete the processing of the service bearer procedure comprises:

sending, by the base station, a first RRC connection reconfiguration message to the UE, so as to control the UE to perform DRB configuration for setting up the first service bearer on the first target data base station, wherein the first RRC connection reconfiguration message comprises the DRB adding instruction and the adding an association relationship between an identifier of the DRB and an identifier of a carrier or a carrier group on the first target data base station, and receiving, by the base station, a first RRC connection reconfiguration completion message, which is sent by the UE after processing of a setup procedure of the first service bearer is complete; and maintaining, by a base station, a correspondence between a service bearer of a user equipment UE accessing the base station and a first target data base station comprises:

recording, by the base station, a correspondence between the first service bearer and the first target data base station.

12. The communications method according to claim 9, wherein:

the service bearer procedure is a service bearer modification procedure, the service bearer request message is a service bearer modification request message, and the service bearer response message is a service bearer modification response message;

acquiring, by the base station, an identifier of the first target data base station, and sending a service bearer request message to the first target data base station according to the identifier of the first target data base station, so as to control the first target data base station to perform the processing of the service bearer procedure of the UE comprises:

receiving, by the base station, the service bearer modification request message sent by a core network device, wherein the service bearer modification request message comprises an identifier of the UE, an identifier of a second service bearer, and quality of service (QoS) information of the second service bearer, and the second service bearer is a service bearer to be modified, and acquiring, by the base station, the identifier of the first target data base station from the correspondence, and sending the service bearer modification request message comprising a DRB modification instruction to the first target data base station according to the identifier of the first target data base station, so that the first target data base station modifies information of the second service bearer and a DRB configuration of the second service bearer on the first target data base station; and receiving, by the base station, a service bearer response message that the first target data base station returns after completing the processing of the service bearer procedure comprises:

receiving, by the base station, the service bearer modification response message, which is sent by the first target data base station after processing of a modification procedure of the second service bearer is complete, and sending, by the base station after receiving the service bearer modification response message, a response message indicating whether the service bearer is successfully modified to the core network device.

13. The communications method according to claim 12, wherein sending, by the base station, an RRC connection reconfiguration message to the UE, so as to control the UE to perform corresponding configuration for the service bearer procedure to complete the processing of the service bearer procedure comprises:

sending, by the base station, a second RRC connection reconfiguration message to the UE, so that the UE modifies the DRB configuration of the second service bearer, wherein the second RRC connection reconfiguration message comprises the DRB modification instruction; and receiving, by the base station, a second RRC connection reconfiguration completion message, which is sent by the UE after the processing of the modification procedure of the second service bearer is complete.

14. The communications method according to claim 9, wherein:

the service bearer procedure is a service bearer deletion procedure, the service bearer request message is a service bearer deletion request message, and the service bearer response message is a service bearer deletion response message;

acquiring, by the base station, an identifier of the first target data base station, and sending a service bearer request message to the first target data base station according to the identifier of the first target data base station, so as to control the first target data base station to perform the processing of the service bearer procedure of the UE comprises:
  receiving, by the base station, the service bearer deletion request message sent by a core network device, wherein the service bearer deletion request message comprises an identifier of the UE and an identifier of a third service bearer, and the third service bearer is a service bearer to be deleted, and
  acquiring, by the base station, the identifier of the first target data base station from the correspondence, and forwarding the service bearer deletion request message to the first target data base station according to the identifier of the first target data base station, so that the first target data base station performs a deletion procedure of the third service bearer; and
receiving, by the base station, a service bearer response message that the first target data base station returns after completing the processing of the service bearer procedure comprises:
  receiving, by the base station, the service bearer deletion response message sent by the first target data base station, and
  sending, by the base station after receiving the service bearer deletion response message, a response message indicating whether the service bearer is successfully deleted to the core network device.

15. The communications method according to claim 14, wherein:
sending, by the base station, an RRC connection reconfiguration message to the UE, so as to control the UE to perform corresponding configuration for the service bearer procedure to complete the processing of the service bearer procedure comprises:
  sending, by the base station, a third RRC connection reconfiguration message to the UE, so as to control the UE to delete a DRB configuration of the third service bearer, wherein the third RRC connection reconfiguration message comprises a DRB deletion instruction, and
  receiving, by the base station, a third RRC connection reconfiguration completion message, which is sent by the UE after processing of the deletion procedure of the third service bearer is complete; and
maintaining, by a base station, a correspondence between a service bearer of a user equipment UE accessing the base station and a first target data base station comprises:
  deleting, by the base station, a correspondence between the third service bearer and the first target data base station.

16. The communications method according to claim 9, further comprising;
  receiving, by the base station, an event report reported by a data base station that receives an uplink signal meeting a preset condition and is within a coverage scope of the base station, storing a correspondence between an identifier of the data base station reporting the event report and the identifier of the UE to the candidate data base station list, and maintaining the candidate data base station list; or
  receiving, by the base station, a measurement result, which is reported by the UE, of a data base station meeting a measurement criterion configured by the base station, storing a correspondence between an identifier of the data base station in the measurement result and the identifier of the UE to the candidate data base station list, and maintaining the candidate data base station list.

17. The communications method according to claim 9, further comprising;
  receiving, by the base station, an event report reported by a data base station that receives an uplink signal meeting a preset condition and is within a coverage scope of the base station, storing a correspondence between an identifier of the data base station reporting the event report and the identifier of the UE to the candidate data base station list, and maintaining the candidate data base station list; or
  receiving, by the base station, a measurement result, which is reported by the UE, of a data base station meeting a measurement criterion configured by the base station, storing a correspondence between an identifier of the data base station in the measurement result and the identifier of the UE to the candidate data base station list, and maintaining the candidate data base station list.

18. A non-transitory computer-readable medium comprising instructions that, when executed, cause an apparatus to:
  maintain a correspondence between a service bearer of a user equipment (UE) accessing the base station and a first target data base station;
  acquire an identifier of the first target data base station, and sending a service bearer request message to the first target data base station according to the identifier of the first target data base station, so as to control the first target data base station to perform the processing of the service bearer procedure of the UE;
  receive a service bearer response message that the first target data base station returns after completing the processing of the service bearer procedure; and
  send a radio resource control (RRC) connection reconfiguration message to the UE, so as to control the UE to perform corresponding configuration for the service bearer procedure to complete the processing of the service bearer procedure; and
  wherein the first target data base station is a base station that exchanges user plane data with the UE after completing the processing of the service bearer procedure of the UE, and the base station is responsible for signaling transmission of a signaling plane.

* * * * *